(12) United States Patent
Crutchfield, Jr. et al.

(10) Patent No.: US 10,091,602 B1
(45) Date of Patent: *Oct. 2, 2018

(54) VIRTUAL SIMULATION OF SPATIAL AUDIO CHARACTERISTICS

(71) Applicant: Crutchfield Corporation, Charlottesville, VA (US)

(72) Inventors: William G. Crutchfield, Jr., Charlottesville, VA (US); Richard I. Wright, Blacksburg, VA (US)

(73) Assignee: Crutchfield Corporation, Charlottesville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/491,037

(22) Filed: Apr. 19, 2017

Related U.S. Application Data

(63) Continuation of application No. 14/709,650, filed on May 12, 2015, now Pat. No. 9,674,633.

(60) Provisional application No. 61/992,542, filed on May 13, 2014.

(51) Int. Cl.
*H04S 7/00* (2006.01)
*G06F 3/0482* (2013.01)
*G06F 3/16* (2006.01)
*H04S 5/00* (2006.01)
*H04R 29/00* (2006.01)

(52) U.S. Cl.
CPC ............. *H04S 7/30* (2013.01); *G06F 3/0482* (2013.01); *G06F 3/165* (2013.01); *H04R 29/002* (2013.01); *H04S 5/00* (2013.01); *H04S 7/40* (2013.01)

(58) Field of Classification Search
CPC ..... H04S 7/30; H04S 5/00; H04S 7/40; G06F 3/0482; G06F 3/165; H04R 29/002
See application file for complete search history.

(56) References Cited

U.S. PATENT DOCUMENTS

| 2007/0010978 | A1 | 1/2007 | Crutchfield, Jr. |
| 2007/0298405 | A1 | 12/2007 | Ebrom |
| 2009/0136051 | A1 | 5/2009 | Chuang et al. |
| 2013/0051574 | A1 | 2/2013 | Yoo |

*Primary Examiner* — David Ton
(74) *Attorney, Agent, or Firm* — Goodwin Procter LLP

(57) ABSTRACT

Embodiments of the present invention are directed to a system and method for demonstrating spatial performance of a demonstration speaker model to consumers in order to evaluate different speakers. The system and method comprise a microphone array for recording the output of the demonstration speaker model. The system and method comprise acoustic input samples for processing to an acoustic output and a processor for determining characteristics of each microphone recording, and processing an acoustic input sample and characteristics of each microphone recording corresponding to a selected demonstration speaker model. The system and method further comprise a reference speaker model for outputting an acoustic signal based on the result of the processing. The processing compensates for the performance characteristic of the reference speaker and the performance characteristic of the selected demonstration speaker so as to mimic the spatial characteristics of the demonstration speaker while avoiding bias from the reference speaker.

29 Claims, 19 Drawing Sheets

US 10,091,602 B1

VIRTUAL SIMULATION OF SPATIAL AUDIO CHARACTERISTICS

CROSS-REFERENCE TO RELATED APPLICATIONS

This patent application is a continuation of, and claims priority to, U.S. Utility patent application Ser. No. 14/709,650, filed May 12, 2015, which claims priority to U.S. Provisional Application No. 61/992,542, filed May 13, 2014. Each of these related applications is hereby incorporated by reference herein in its entirety.

FIELD OF THE INVENTION

The present invention relates to measuring and simulating the spatial characteristics of a sound source, such as an audio speaker. More specifically, the invention relates to simulating how a demonstration sounds in different points in space.

BACKGROUND OF THE INVENTION

As illustrated in FIG. 1, systems and methods exist that allow retail outlets to use a reference speaker to demonstrate the performance of multiple demonstration speakers. For example, the Virtual Speaker Demonstration System And Virtual Noise Simulation disclosed in U.S. Pat. Nos. 7,096,169 and 7,899,656, incorporated herein by reference, enables a customer to simulate the performance of a particular demonstration speaker using a reference speaker. These virtual speaker demonstration systems simulate the output of the selected demonstration speaker by determining characteristics of the demonstration speaker and applying these characteristics to a sample acoustic input.

Significantly, however, the characteristics of a demonstration speaker are typically derived (empirically or analytically) without regard to its spatial characteristics. That is, retailers often empirically determine the characteristics of a demonstration speaker by measuring its transfer function at a single point in space. FIG. 1 illustrates an exemplary prior art embodiment, where a single microphone 102 is used to measure a transfer function of the demonstration speaker at a single point in space. Although such a transfer function may be used to simulate a demonstration speaker, the transfer function will not be an accurate representation of how the demonstration speaker would sound at any other point in space.

Audio enthusiasts understand that a key driver of sound quality in audio equipment is how sound waves disperse from a sound source. For example, acoustic phenomena such as speaker directivity, interaction between multiple drivers, and diffraction affect which frequencies of sound can be heard at different distances or angles from a speaker. Directivity, for instance, characterizes a speaker's ability to emit different spectral frequencies of an audio signal in one particular direction. In all wave-producing sources, the directivity of any source generally corresponds to the size of the source compared to the wavelengths it is generating. Thus, loudspeakers tend to radiate sound omnidirectionally (i.e., uniformly in all directions) at low frequencies, because the physical components of the speaker, such as surface dimensions and cabinetry, are generally small compared to the wavelength of the sound. However, at high frequencies, speakers tend to beam the sound, because the physical components of the speaker are no longer negligible as compared to the sound's wavelength. Thus, speakers typically generate a "beam" of high spectral frequencies directly in front of a speaker, while lower bass-like frequencies may be perceived both in front, and behind a speaker. Further complexities may be added to the speaker's spatial characteristics when multiple drivers are radiating in the same frequency range, such as the crossover region, and when acoustic diffraction occurs due to physical discontinuities, such as at the edges of the speaker cabinet. More generally, each loudspeaker radiates a different spectrum of frequencies at different angles off of its central axis (off-axis). Accordingly, each loudspeaker has a distinct transfer function that depends on the listener's location in space. Consequently, listeners located at different positions around a speaker will each hear a different spectrum of sound, even though they are each listening to the same speaker.

Directivity, and other similar spatial characteristics, may be represented as directivity patterns, illustrated in FIGS. 2A and 2B. FIG. 2A is an exemplary polar plot that illustrates the frequency gain of a demonstration speaker for a particular frequency (e.g., 10 kHz) across a 360° rotation around the demonstration speaker. As FIG. 2A illustrates, the frequency response has higher gain due to beam-forming in front of the speaker, while less energy radiates to the rear. FIG. 2B is an exemplary directivity plot illustrating how a speaker may have different frequency response gains at different frequencies, and at different angles off of the speaker's center axis. For example, a frequency of 125 Hz may have a gain of −3 dB at 90°, whereas a frequency of 1.6 kHz may have a gain of −9 dB at 90°. As these figures illustrate, the transfer function of a speaker may vary drastically as it is measured throughout different points in space. As stated above, listeners consequentially hear different spectrums of frequencies at different points in space.

Differences in the build of the speakers, such as shape, material, dimensions, and placement of components (e.g., the transducer) in the casing, may also affect the ability of the speaker to project, i.e., "throw", a sound wave at varying distances from the speaker in a coherent fashion. As with directivity, the dispersion of the sound wave from the speaker depends on the frequency of the sound wave, the technical specifications of the speaker driver, and the dimensions (e.g., shape size, positioning, etc.) of the speaker horn As a result, audio enthusiasts generally understand that two different speakers may exhibit different sound quality as a result of how sound waves disperse from the speakers, i.e., the spatial characteristics of the speakers.

Although audio retailers are generally aware that different speakers disperse sound differently (reflecting a difference in sound quality), audio retailers typically do not provide an effective way to demonstrate this difference to audio consumers. As noted above, prior demonstration systems such as those disclosed in U.S. Pat. Nos. 7,096,169 and 7,899,656 and implemented in Crutchfield's Virtual Speaker System, are generally limited to the acoustic performance of speakers as measured from a single point in space. As FIG. 1 illustrates, acoustic characteristics (e.g., frequency responses and transfer functions) of a speaker are typically measured from a single point in space, 102, in relation to the speaker. This single data point is then applied to a reference speaker 106 to simulate the performance of the demonstration speaker 101. Accordingly, demonstration systems currently provided by audio retailers typically do not demonstrate the spatial performance of a speaker, i.e., the impact of sound quality due to the dispersion of the sound waves from the speaker, because the acoustic characteristics are only measured from a single point in space.

For one, audio retailers do not have an efficient means for empirically measuring spatial characteristics at multiple points in space. Typically, determining directivity pattern is time and resource intensive, usually requiring a retailer to make discrete sequential measurements of a speaker's transfer function at different angles around speaker. While systems such as microphone arrays exist, which enable retailers to make several simultaneous measurements of a speaker's transfer function in space, several drawbacks exist. Microphone arrays are generally applied to problems in two categories of acoustics: 1) beam-forming; and 2) near-field acoustic holography ("NAH"). Beam-forming microphone arrays process the microphone signals in a way that causes the array system to be more sensitive to sound coming from one particular direction. NAH is concerned with using acoustic measurements to determine the vibration of an acoustically radiating surface. Significantly, these applications of microphone arrays are not typically designed to capture the spatial performance characteristics of a loudspeaker.

Even where audio retailers have spatial characteristics measured from multiple points in space, problems exist in combining speaker characteristics to effectively simulate these spatial characteristics to users. Electro-acoustic modeling software packages (such as EASE®, MEYER®, or ANSYS®) provide analytic acoustic information (e.g., directivity and dispersion). However, these modeling software packages are generally time and resource-intensive to use. Accordingly, an efficient means for measuring the acoustic characteristics of any sound source, and simulating the sound source with empirical data is needed.

Further problems exist with combining different empirically derived spatial characteristics. When combining and processing characteristics from multiple sources at different points in space, the oscillatory behavior, thus the complex nature of the data, must be carefully considered to avoid introducing unrealistic distortions. Accordingly, an efficient means for combining the acoustic characteristics measurements of sound sources while minimizing the introduction of distortions is needed. Other problems and drawbacks also exist.

Even when the empirically derived spatial characteristics are suitably combined, simulation errors remain due to the single degree of freedom (SDOF) afforded by the traditional reference speaker. The remaining error is due to the difference in acoustic spatial radiation patterns between the target simulation speaker and the reference speaker used to perform the simulation. Thus, there exists a need for a multi-degree of freedom (MDOF) reference speaker, such as a speaker array consisting of several acoustic drivers that may allow the control over the reference speaker's spatial radiation pattern, and in turn, allow accurate simulation of the target simulation speaker's temporal and spatial characteristics simultaneously.

SUMMARY OF THE INVENTION

Embodiments of the present invention comprise a virtual speaker demonstration system that permits a retail outlet to measure the temporal and spatial characteristics of a demonstration speaker. The temporal and spatial characteristics of a demonstration speaker may be measured at multiple points in space. These characteristics may include transfer functions, impulse responses, and similar mathematical functions. The characteristics may be combined into a single characteristic representative of the speaker's spatial audio characteristics. The measured characteristics may then be used to derive the output to a traditional reference speaker or the outputs to a speaker array to simulate the spatial characteristics of the demonstration speaker.

BRIEF DESCRIPTION OF THE DRAWINGS

The objectives and advantages of the present invention will be apparent to those of skill in the art from the following detailed description in conjunction with the appended drawings in which like reference characters are used to indicate like elements, and in which.

DETAILED DESCRIPTION OF THE INVENTION

Figure 1:
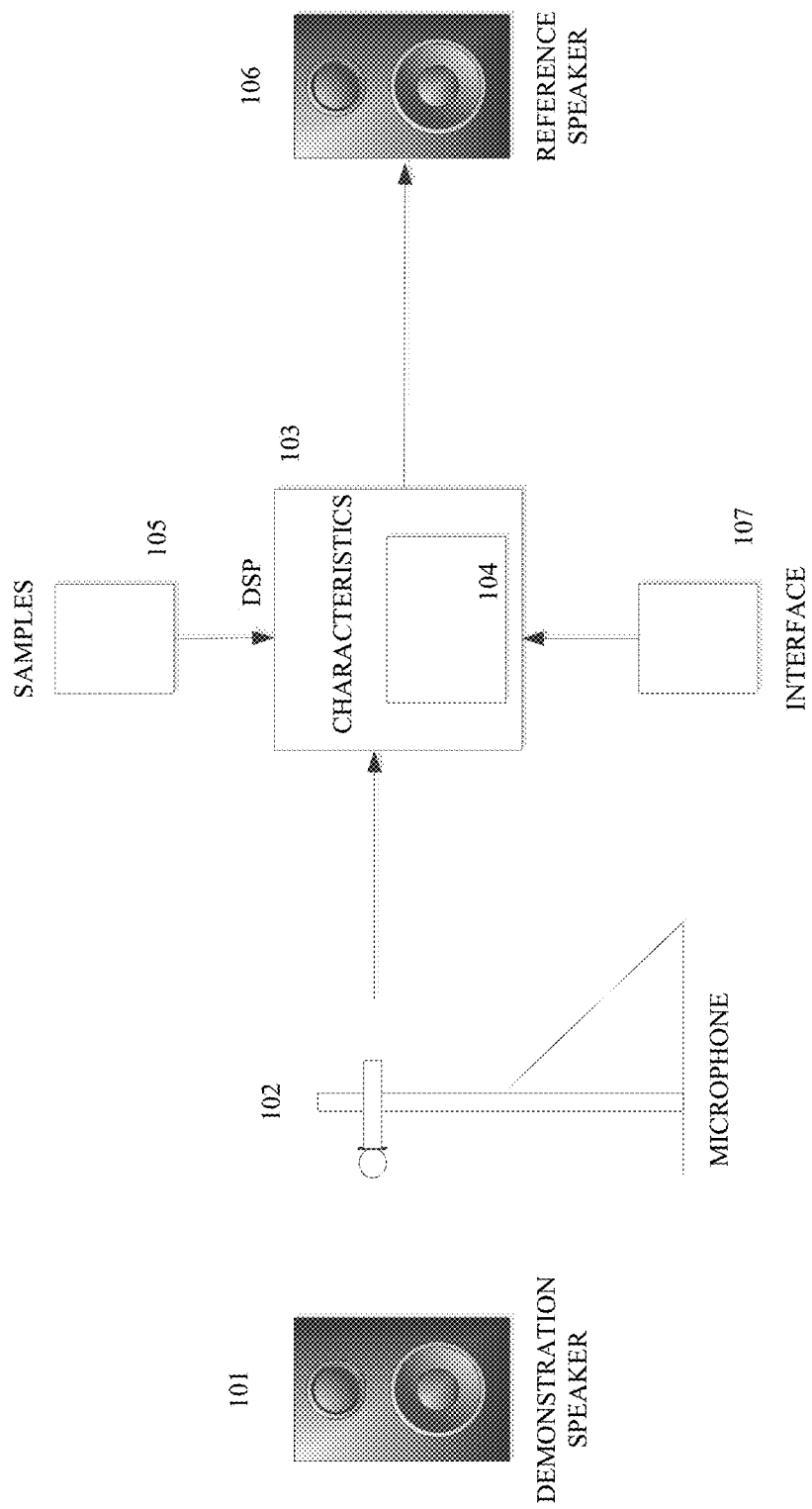
FIG. 1 is a diagram of a virtual demonstration system according to prior art systems and methods.
Figure 2:
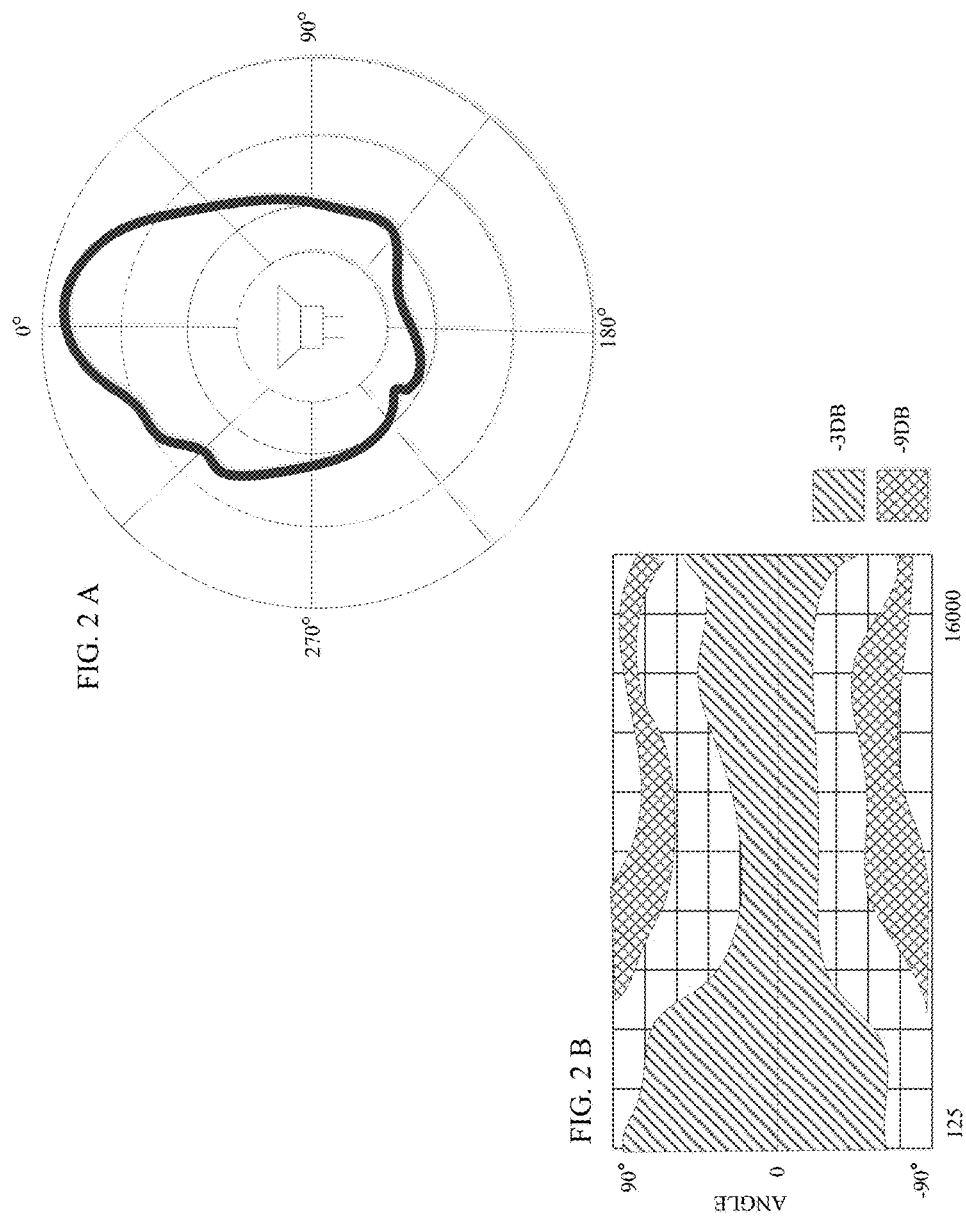
FIGS. 2A and 2B are exemplary directivity patterns of a speaker.
Figure 3:
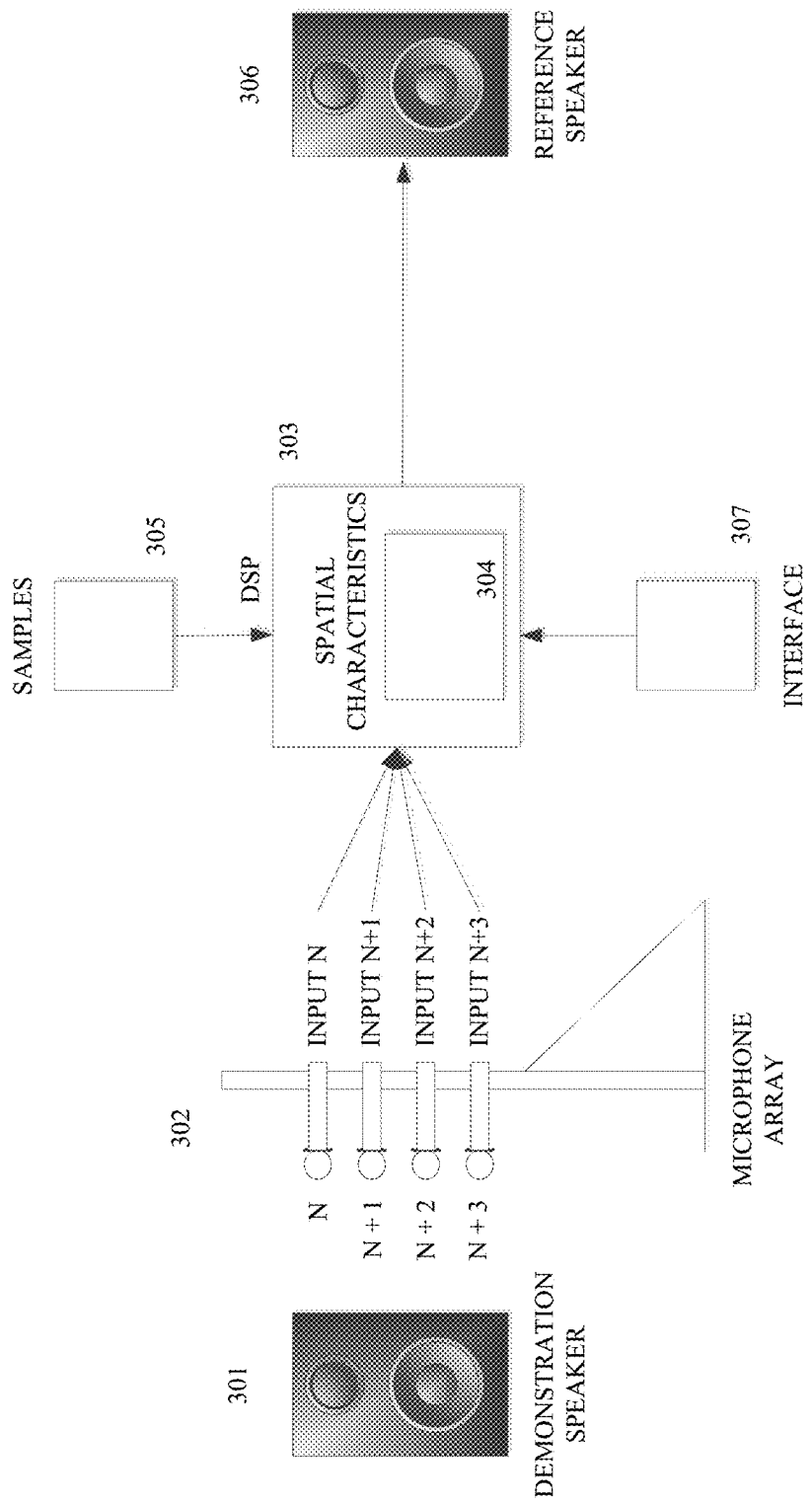
FIG. 3 is an exemplary virtual demonstration system for spatial audio characteristics according to one embodiment of the invention.

FIG. 3 is a diagram of the virtual demonstration system according to an embodiment of the invention. The virtual demonstration system includes a demonstration speaker 301, a microphone array 302, a digital signal processor (DSP) 303, characteristics 304, samples 305, a reference speaker 306, and an interface 307.

Generally, the operation of the spatial demonstration system is as follows. A user, such as an audio equipment retailer, wishing to simulate the performance of audio/stereo equipment, such as a speaker, measures the spatial characteristics of the audio/stereo equipment. The user measures the characteristics by positioning a demonstration speaker 301 near a microphone array 302. A microphone array 302 may support a number of microphones N, N+1, N+2, N+3, etc., for recording the output of the demonstration speaker at different points in space. In an embodiment of the invention, the microphone array 302 may be comprised of one microphone. In an embodiment of the invention, the microphone array 302 may be comprised of multiple microphones. FIG. 3 depicts a profile view of the microphone array according to one embodiment of the invention. As discussed in more detail below, the microphones may be spaced along the microphone array in a number of different axes, directions, and positions. According to some embodiments of the invention, the acoustic characteristics are measured using a microphone array. In embodiments of the invention, each microphone is preferably designed to receive and measure omnidirectional sound waves.

The user applies an input signal, such as a song, to the demonstration speaker 301. The demonstration speaker 301 plays the song, emitting sound waves according to the demonstration speaker's inherent spatial characteristics. That is, inherent qualities of the demonstration speaker 301, such as the materials, diaphragm, etc., will affect how the sound waves disperse from the speaker. Thus, for example, different frequencies of the song may be heard with different loudness at different points in space around the speaker. Each microphone N, N+1, N+2, etc., in the microphone array 302 captures the output of the demonstration speaker 302 at different points in space. The output captured by each microphone is then sent to the DSP 303 as input signals INPUT N, INPUT N+1, INPUT N+2, INPUT N+3, etc. According to some embodiments of the invention, the DSP 303 includes a data acquisition system, such as the National Instruments DAQ PXI Platform®, for acquiring the signals output by each microphone. Each microphone supported by the microphone array 302 may be coupled to the data acquisition system via communication and connection ports well known in the art, such as 0.8 mm, S-100, or XLR cable connection, or similar wired or wireless network connection.

The DSP 303 acquires the microphone input signals and determines the characteristics 304 of each input signal. Characteristics 304 generally refer to transfer functions, impulse responses, or other mathematical descriptions that characterize acoustic performance. Characteristics 304 may be used to characterize and, therefore, account for, the effects of various components of an acoustic system on overall acoustic performance. For example, characteristics 304 may be characteristics for demonstration speakers, reference speakers, demonstration spaces (rooms or vehicle interiors), reference spaces (e.g., the listening room in a retail outlet where the virtual demonstration is presented), amplifiers, tuner/receivers, equalizers, and so forth. Additionally, in a beneficial embodiment allowing the user to "build" his/her own demonstration space, characteristics 304 may include absorption parameters for various materials and geometry parameters which can be used to create a demonstration room.

Using digital signal processing techniques, DSP 303 determines the characteristics 304. According to some embodiments of the invention, as discussed in more detail below, a characteristic is determined for each microphone input signal, INPUT N, INPUT N+1, . . . , etc. In this way, the DSP may determine the characteristics of the demonstration speaker 301 at several points in space. According to other embodiments of the invention, the DSP may combine the characteristics of each microphone input signal into a single characteristic using digital processing techniques discussed in more detail below. According to other embodiments of the invention, the DSP may utilize the microphone input signals to determine the set of output signals for a speaker array to reproduce the characteristics of the demonstration speaker 301. For example, the DSP may use the microphone signals to perform a Filtered-X Least Mean Square Adaptive Filter algorithm to compute the filter coefficients that determine the reference speaker output or set of filter coefficients that determine the speaker array outputs.

A retailer may store a database of different spatial characteristics for each demonstration speaker in their inventory. According to some embodiments, spatial characteristics may be determined for each make, model, year, or similar manufacturing parameters of the speaker. Spatial characteristics may further be determined for various different environmental characteristics (e.g., a room or an interior of a vehicle) or environmental conditions (e.g., vehicle speed, windows open/closed, etc.). For example, to simulate how a speaker may sound at various different distances from a listener, the spatial characteristics of the speaker may be measured at various distances between the demonstration speaker and microphone array. According to some embodiments, the database of spatial characteristics for various different demonstration speakers may be stored in DSP 303. In other embodiments, the spatial characteristics may be stored externally to the DSP, such as on a computer, server, or a computer readable storage medium (not pictured) that stores non-transitory data signals, including magnetic storage media (for example, ROMs, floppy discs, hard disks, etc.), or optically-readable media (for example, CD-ROMs, VDs, etc.). Distinct from computer readable storage medium, the spatial characteristics may also be stored in transmission media that stores transitory signals, such as data signals embodied in carrier waves (e.g., transmitted through a network).

A customer may simulate a particular make and/or model of loudspeaker by choosing the characteristics for the loudspeaker via interface 307. The user may navigate the interface by selecting various options. The options may include parameters such as the make, the model, environmental characteristics, environmental conditions, and others further described below. The options may also include basic start (e.g., "Start Virtual Demonstration"), play (e.g., "Play Virtual Demonstration"), and stop (e.g., "End Virtual Demonstration") options. The interface 307 may include a keyboard, touch screen, voice recognition module, mouse or similar point-and-click device, or any similar device usable for inputting selections.

Samples 305 are acoustic samples, such as samples of music, test sounds, spoken voice, etc. According to one approach, samples 305 are pre-stored in the virtual demonstration system and selected by the user via interface 307. According to another approach, samples 305 may be input by the user externally, for example via a physical computer readable storage device, such as a CD, DVD, USB drive, or similar device, or a network connection, such as Ethernet, Wi-Fi, Bluetooth, or similar network connection for inputting acoustic samples to the demonstration system.

The user may run the virtual spatial demonstration by applying the user-selected options to the user-selected input. Using digital signal processing techniques discussed in more detail below, DSP 303 processes the user-selected characteristics 304 and acoustic samples 305 to produce an output representative of how the input would sound being played from the selected demonstration speakers. This output may then be played through reference speaker 306.

The user can then run the virtual spatial demonstration again by selecting different options, such as a different set of demonstration speakers, a different environment, a different amplifier, and so forth. In each case, the user will be hearing the virtual output at any location within the reference environment (i.e., the listening room) through the same reference speakers, thus permitting a convenient and fair ("apples to apples") comparison.

The virtual system of FIG. 3 is presented in simplified form in order to highlight the unique features of the invention. It should be understood that the virtual system may include various conventional operations, such as anti-aliasing filtering, digital-to-analog conversion (DAC), amplification, and various signal conditioning processes, before outputting the virtual signal through reference speakers 306. The signal processing performed by DSP 303 in order to implement the invention is well understood in the art.

Generally, characteristics of speakers, environments, amplifiers, and other components of the total acoustic system can be expressed as transfer functions (frequency domain) or impulse responses (time domain equivalent of the transfer function). These transfer functions can be determined analytically (through modeling and prediction, such as ray tracing) or empirically (through measurement). In a preferred embodiment of the invention, the transfer functions are determined empirically.

For example, transfer functions of the various demonstration speakers supported by the virtual system can be measured in an anechoic chamber by stimulating the speakers with a basic acoustic input and the measuring the response. Preferably, the response is measured across a frequency spectrum of interest to users, such as about 5 Hz to 30,000 Hz, which goes beyond the typical range of human hearing but which will include the vibratory effects at the low and high ends. Because the microphone array captures sound emitted from the demonstration speaker at multiple points in space, the measurement of the transfer function may be made at multiple angles with respect to the demonstration speaker (to derive a response which is a function of angle).

According to one embodiment of the invention, the transfer functions of both the demonstration speakers and the reference speakers are measured. This permits the effects of the reference speakers to be removed and the effects of the selected demonstration speaker to be inserted.

The transfer functions of the environments can be measured in analogous fashions. For example, the virtual system may include options for various demonstration environments (rooms or vehicle interiors). The transfer functions for these demonstration environments can be determined analytically or empirically. If determined analytically, ray tracing or other acoustic modeling techniques are used to predict an impulse response for an analytic demonstration environment defined by geometric parameters, materials, and sound absorption/reflection parameters. If determined empirically, actual demonstration environments are employed and then stimulated with a known acoustic input through a speaker or transducer with known transfer characteristics. The impulse response of the demonstration environment can then be extracted using well known principles of acoustic signal processing.

According to one embodiment of the invention, the transfer functions of both the demonstration environment and the reference environment are measured. This permits the effects of the reference environment to be removed and the effects of the selected demonstration environment to be inserted.

The transfer functions of other components in the overall acoustic system can be determined in analogous fashions. For example, the virtual demonstration system may include a reference amplifier for powering the demonstration, but the user may be allowed to select a demonstration amplifier. For example, the user might want to comparatively assess the performance of speaker set 1 versus speaker set 2 where each is powered by amplifier X. In order to support this capability, the virtual demonstration system may provide for the transfer characteristics of various demonstration amplifiers (note: amplifiers is construed broadly here, and could include receivers or separate amplifier/tuners) to be predicted/measured (or provided by a manufacturer) and stored. Preferably, the transfer characteristics of the reference amplifier are known and can be removed before the characteristics of the selected demonstration amplifier are inserted. DSP 303 performs the digital signal processing to produce the simulation output.

DSP 303 may be a processor, microprocessor, microcontroller, computer, or similar device. The principles behind the operations performed by DSP 303 are well understood in the art. The reader is referred to the following texts for background on signal processing operations (e.g., inverse filtering, compensation, time domain filtering, frequency domain filtering, and so forth) that may be used to implement the invention: A. V. Oppenheim & R. W. Schafer, *Digital Signal Processing* (Prentice-Hall: 1975); B. Widrow & S. D. Steams, *Adaptive Signal Processing* (Prentice-Hall: 1985); P. A. Nelson & S. J. Elliot, *Active Control of Sound* (Harcourt Brace: 1992); J. S. Bendat and 65 A. G. Piersol, *Random Data* (John Wiley & Sons: 1986); *Reference Data for Engineers*, 9'h ed. (Butterworth-Heinmaun: 2002); and L. R. Rabiner & R. W. Schafer, *Digital Processing of Speech Signals* (Prentice-Hall: 1978). Exemplary operations that may be performed by DSP 303 are discussed further in connection with FIG. 13.

Figure 4:
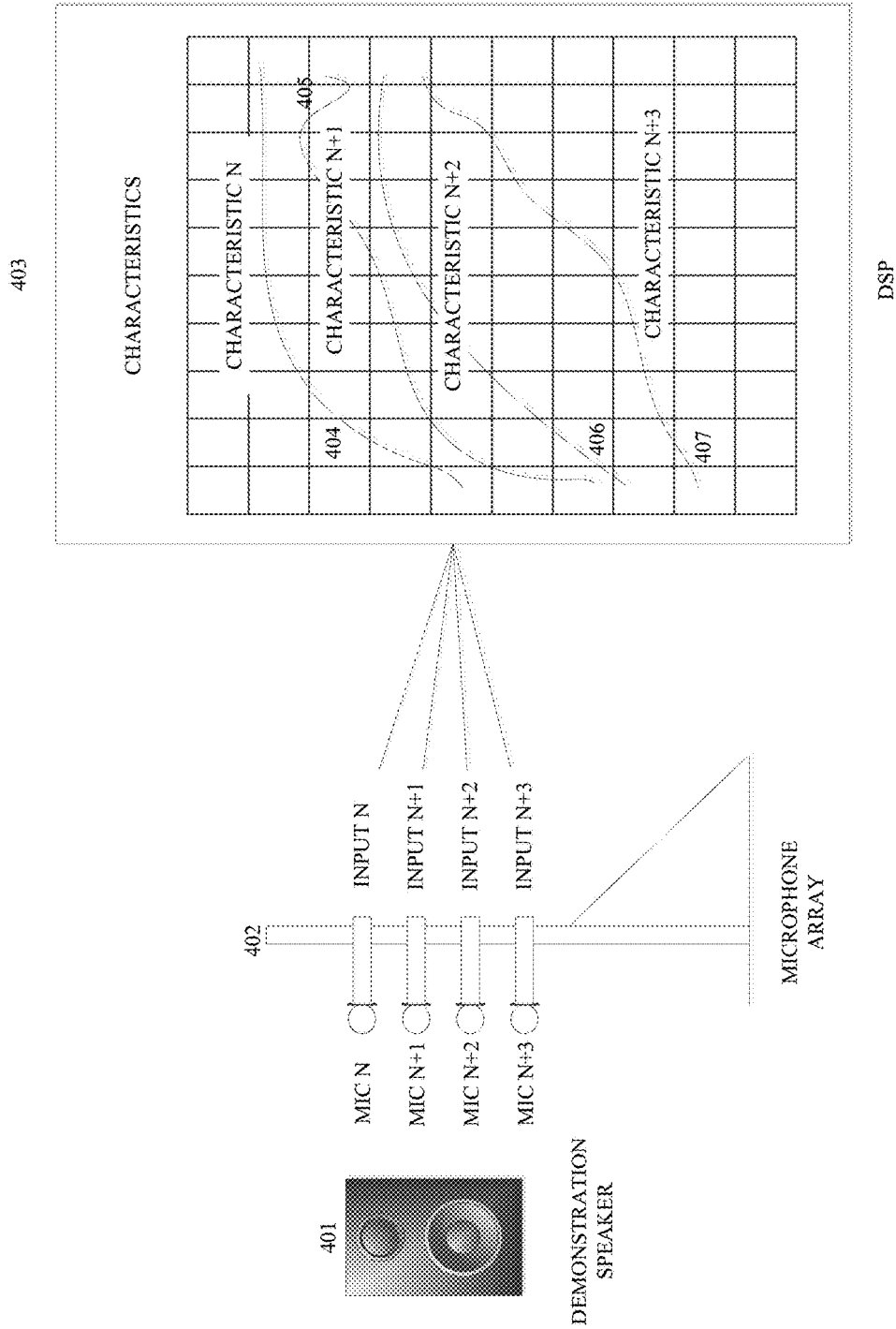
FIG. 4 is an illustration of the spatial audio characteristics stored in the virtual demonstration system according to one embodiment of the invention.

FIG. 4 is a block diagram illustrating the details of the acquisition and processing of the microphone input signals according to one embodiment of the invention. Microphones N, N+1, N+2, N+3, etc., capture the output of the demonstration speaker as input signals, INPUT N, INPUT N+1, INPUT N+2, INPUT N+3, etc. The DSP acquires the microphone input signals and processes them using the digital processing techniques described above to determine CHARACTERISTIC N, CHARACTERISTIC N+1, CHARACTERISTIC N+2, CHARACTERISTIC N+3, etc. As FIG. 4 illustrates, characteristics may be expressed as transfer functions (frequency domain) or impulse responses (time domain equivalent of the transfer function). FIG. 4 depicts a bode plot of the transfer functions of each microphone input signal, illustrating the magnitude of the frequency response gain, or frequency response phase shift as a function of frequency. In this way, the DSP determines the transfer function of the demonstration speaker at several different points in space.

Figure 5:
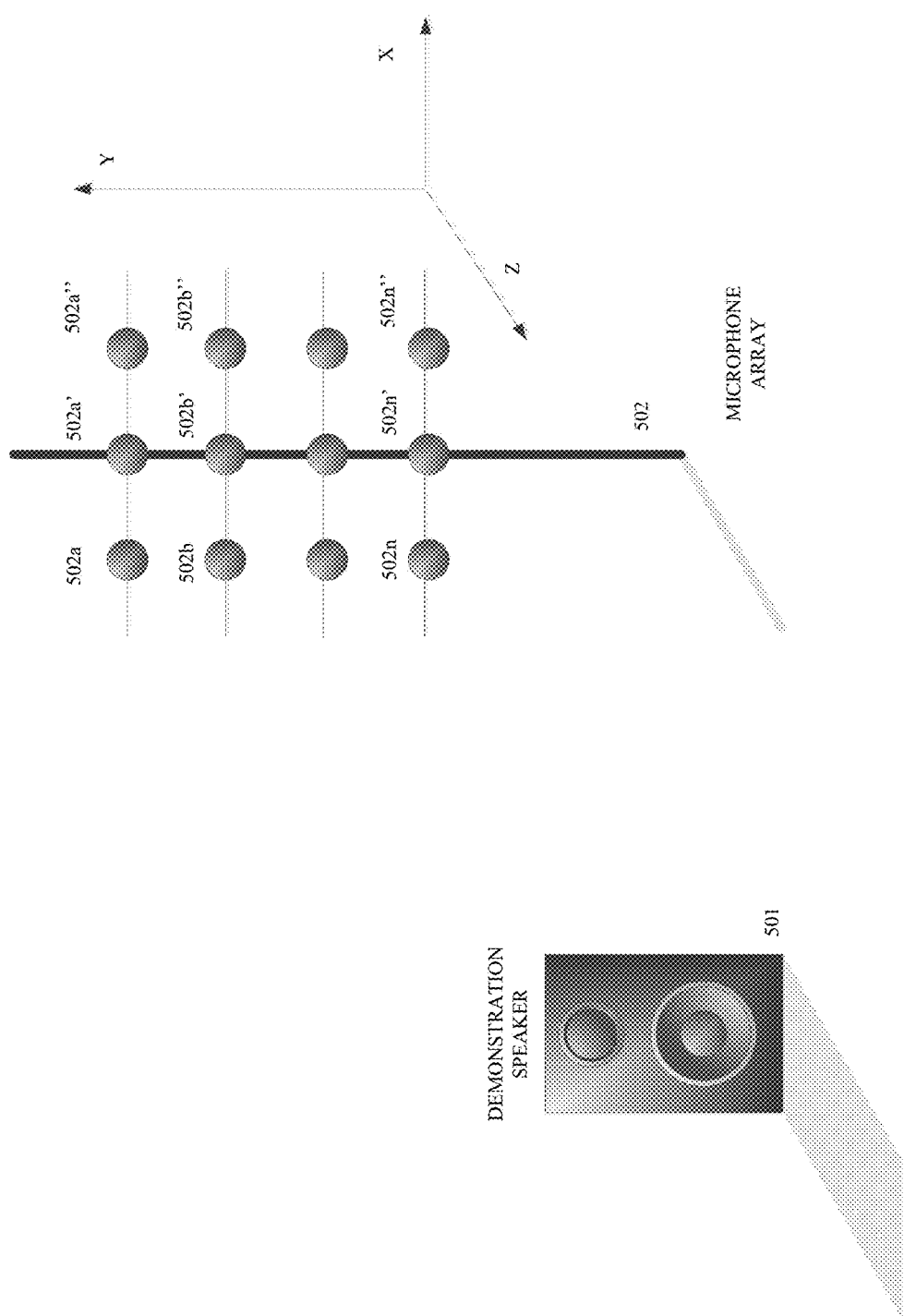
FIG. 5 is an illustration of the front view of a microphone array in a virtual demonstration system according to one embodiment of the invention.

FIG. 5 illustrates a frontal view of the microphone array 502 according to one embodiment of the invention. The microphones supported by the array may be arranged in any particular plane. FIG. 5 depicts one exemplary arrangement, where the microphones 502a . . . 502n" are arranged across the plane facing the demonstration speaker 501 (i.e., the X-Y plane). According to one embodiment, the microphones 502a . . . 502n" may be arranged evenly across the plane, such as for example, every three inches apart in the X-direction, and every 4 inches apart in the Y-direction. In this way, the spatial demonstration system may determine characteristics of the demonstration speaker 501 at any height, or angle from the speaker. According to some embodiments, the microphones 502a . . . 502n" may be placed at positions corresponding to the positions of the speaker components. For example, microphones may be placed at the same heights as a speaker's 501 tweeter and woofer.

Figure 6:
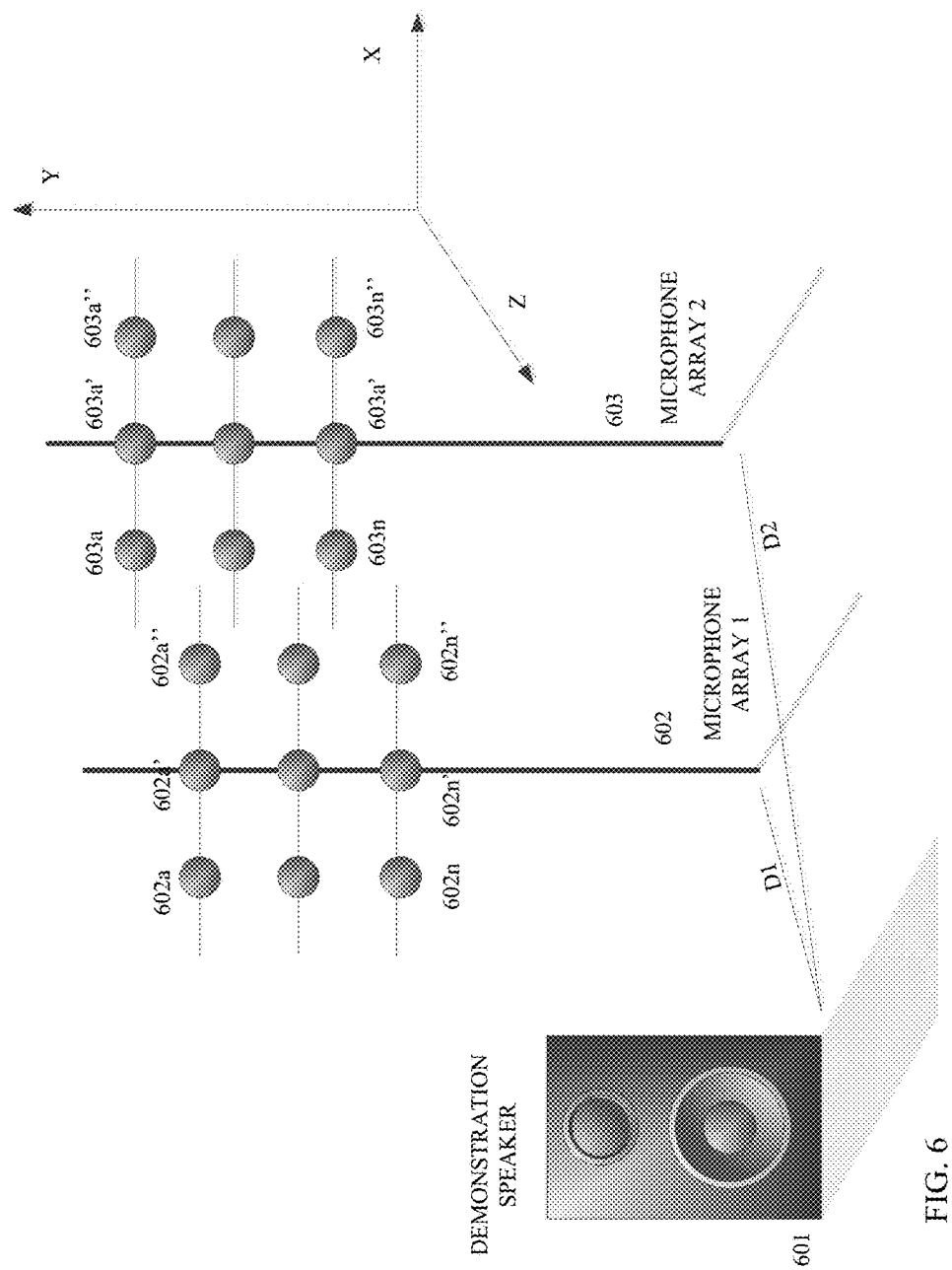
FIG. 6 is an illustration of the front view of a plurality of microphone arrays in a virtual demonstration system according to another embodiment of the invention.

FIG. 6 illustrates the spatial demonstration system according to one embodiment of the invention where microphones 602a . . . 602n" and 603a . . . 603n" in microphone arrays 602 and 603 are arranged along multiple planes. FIG. 6 depicts one exemplary arrangement, wherein the microphones are arranged across the X-Y plane at a distance D1, and a distance D2 from the demonstration speaker 601. In this way, the spatial demonstration system may determine characteristics of the demonstration speaker 601 at any height, angle, or distance from the speaker.

Figure 7:
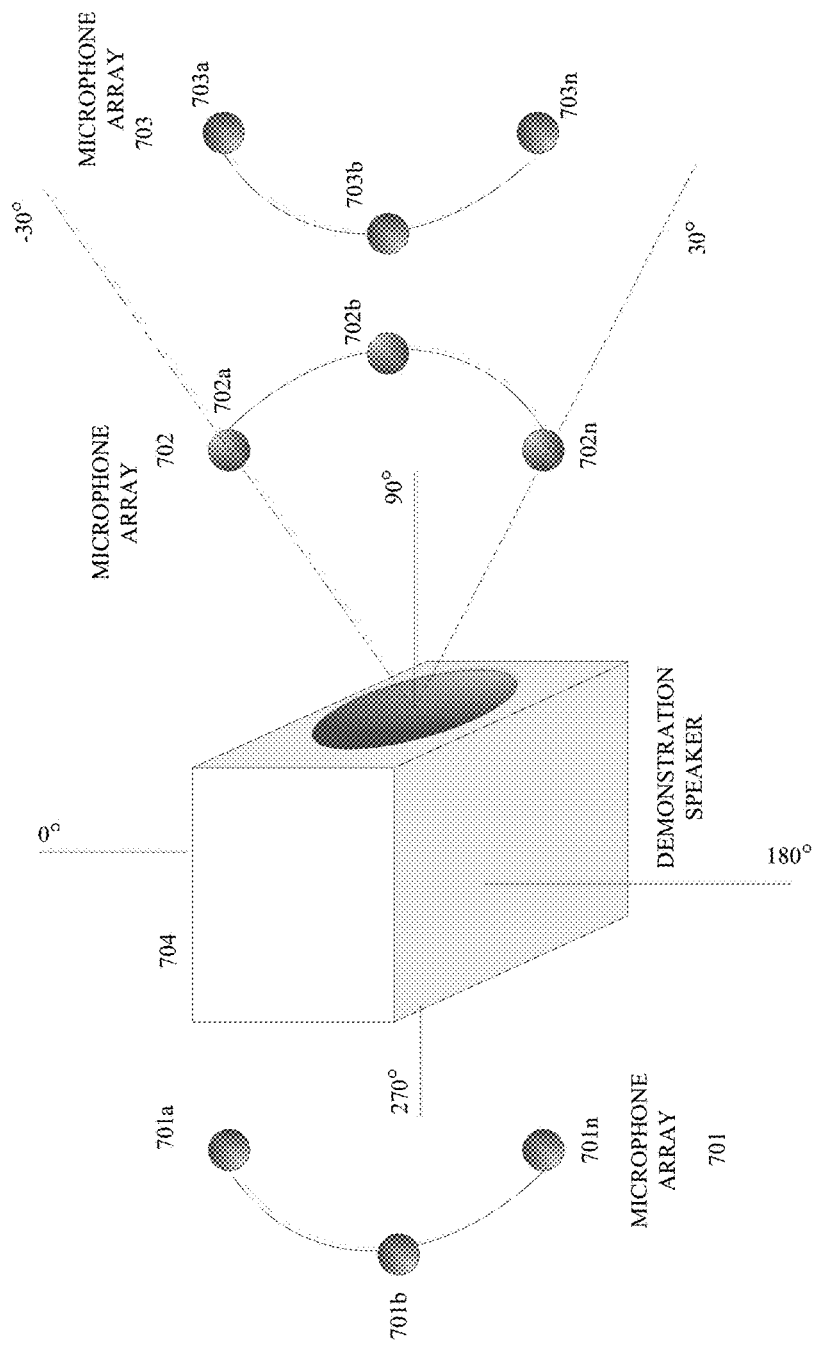
FIG. 7 is an illustration of an arrangement of microphone arrays surrounding a demonstration speaker according to another embodiment of the invention.

FIG. 7 is a top-view of microphone array arrangements and positions according to embodiments of the invention. A microphone array may be positioned at any angle around the demonstration speaker 704. For example, microphone array 702 may be positioned directly in front of the demonstration speaker 704. In other embodiments, microphone array 701 may be positioned behind the demonstration speaker (i.e., 270° on the axis as shown on the diagram). As explained above, frequencies of acoustic waves disperse from a speaker with a different response gain depending on their angle of propagation. Microphones may be positioned around the demonstration speaker such that the response gain may be determined over the entire sphere surrounding the speaker.

FIG. 7 further demonstrates that the microphones in microphone arrays may be arranged along nonlinear planes. Whereas the microphones depicted in FIGS. 3-6 are arranged along a linear (i.e., flat) plane, the microphones depicted in FIG. 7 (701a . . . 701n, 702a . . . 702n and 703a . . . 703n) are arranged along an arcuated curvilinear plane. One advantage of arranging the microphones along the convex or concave planes as depicted in FIG. 7 is that the spatial demonstration system may capture the output of the speaker at multiple angles over, for example a constant distance, than a flat microphone array. For example, microphone array 702 may capture speaker output across the range spanning −30° to 30°.

Another advantage of arranging the microphones along the convex or concave planes as depicted in FIG. 7 is that the spatial demonstration system may capture how sound disperses throughout different geometries of rooms. For example, arranging the microphones in along an arcuated curvilinear plane as 702 would be ideal for capturing how waves would disperse from a demonstration speaker in a semi-circular area, such as an amphitheater.

Figure 8:
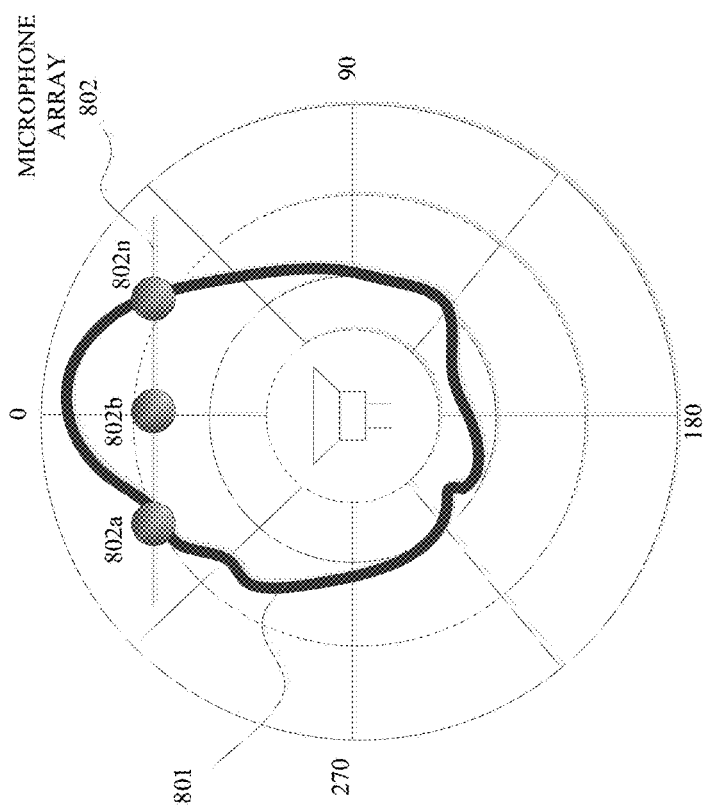
FIG. 8 is an illustration of the top view of a microphone array superimposed over a directivity pattern according to one embodiment of the invention.

FIG. 8 is a diagram depicting a microphone array's position overlaid onto a polar plot of a demonstration speaker's directivity pattern. As the figure illustrates, the different positions of the microphones 802a . . . 802n in the microphone array 802 enable the demonstration system to measure the different frequency response gains of the speaker at different angles off the speaker's central axis.

Figure 9:
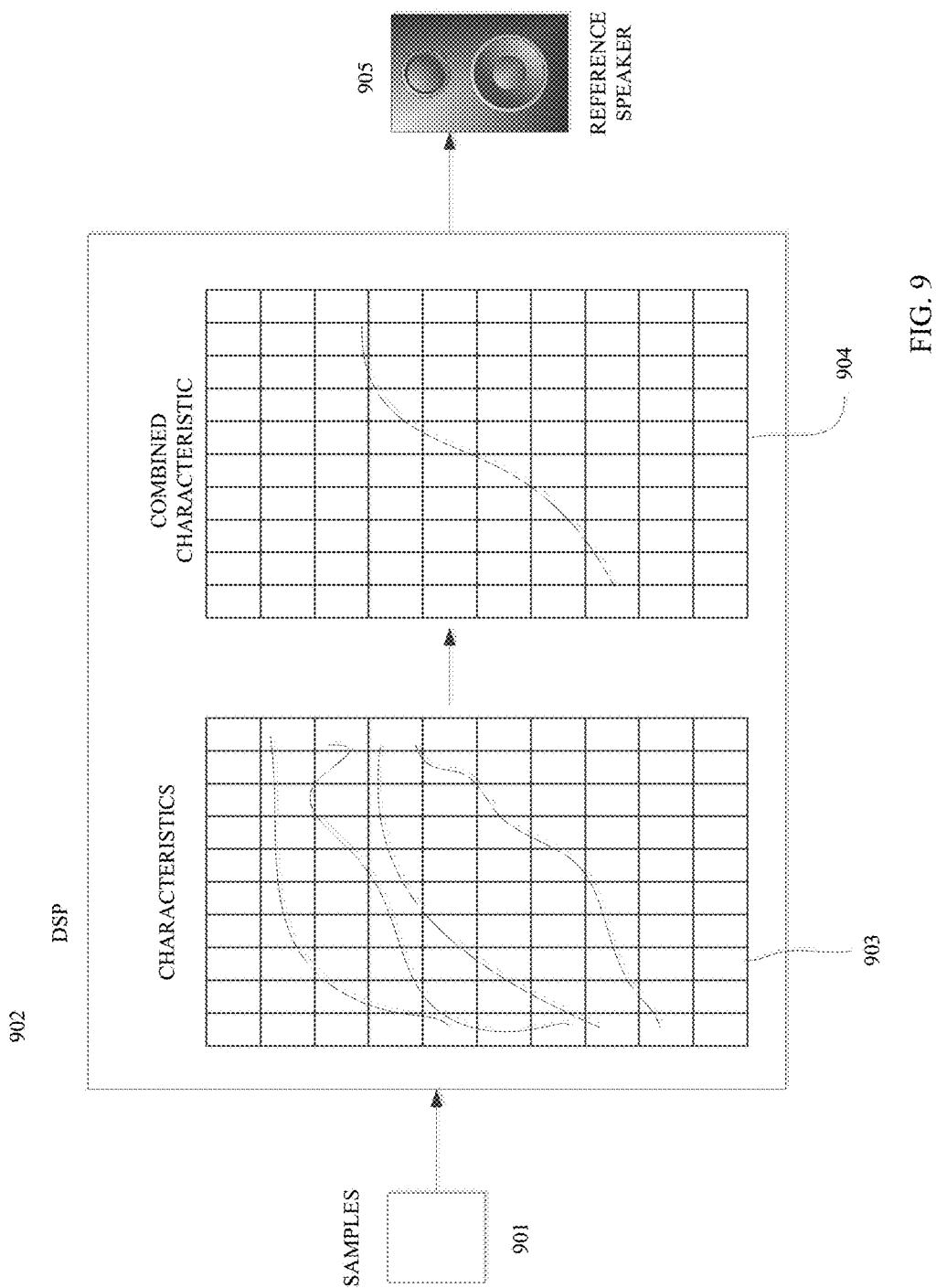
FIG. 9 is an illustration of a DSP combining characteristics for playing samples on a reference speaker according to one embodiment of the invention.

FIG. 9 is a block diagram illustrating the characteristics processed and stored by the DSP 902 according to one embodiment of the invention. As FIG. 9 illustrates the DSP may combine the characteristic 903 of each microphone input signal, INPUT N, INPUT N+1, INPUT N+2, etc, into a single characteristic 904 representative of the spatial characteristics of the speaker on the whole. That is, according to one embodiment, the DSP reduces the spatial characteristics of the demonstration speaker into a spatially averaged characteristic suitable for output on a traditional reference speaker.

One advantage to combining the characteristics into a single characteristic is that the single characteristic may be applied to a traditional reference speaker that contains only a single degree of freedom in the form of a single electrical input. As FIG. 9 shows, the DSP applies the combined characteristic to the input samples 901, and plays the output signal through the reference speaker 905. Because the single characteristic considers the spatial features of the demonstration speaker, the reference speaker provides a more accurate simulation of the demonstration speaker than traditional approaches.

Figure 10:
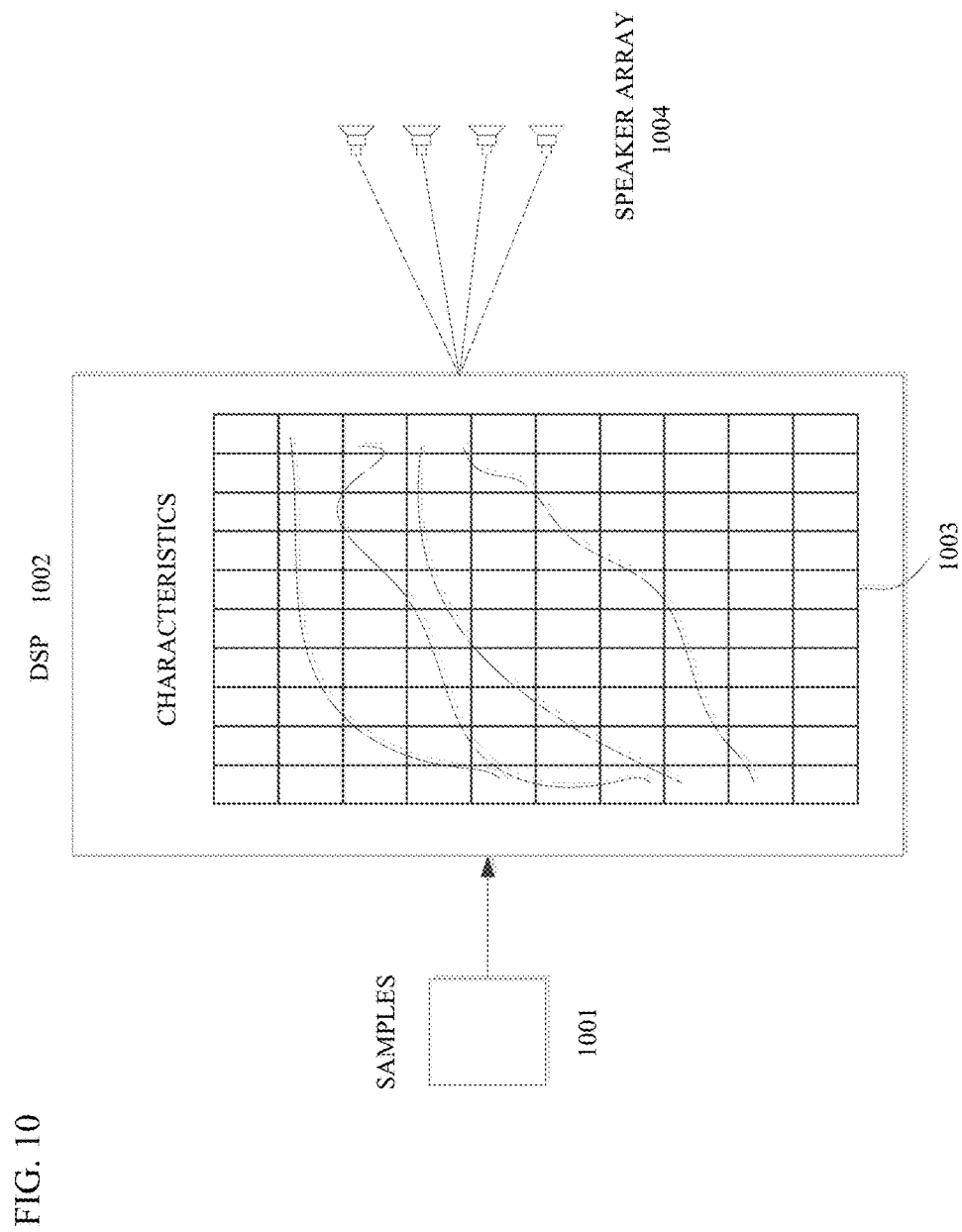
FIG. 10 is a diagram of a speaker array according to one embodiment of the invention.

According to other embodiments of the invention, the acoustic characteristics are applied to a speaker array, containing multiple independent speaker elements that replace the traditional reference speaker to generate an acoustic output simulating the demonstration speaker, as illustrated in FIG. 10. The DSP 1002 may utilize each characteristic 1003 N, N+1, N+2, etc., to generate output N, N+1, N+2, etc. Each output drives a single element of the speaker array whose acoustic responses all combine to simultaneously reproduce how the demonstration speaker would play the audio input at the microphone positions associated with N, N+1, N+2, etc. In some embodiments, the speaker array elements may be arranged in a single dimension (e.g., a line of speakers), in two dimensions (e.g., a speaker face), or in three dimensions. The speakers may be arranged horizontally, vertically, or in any other similar position. In other embodiments, the acoustic characteristics being applied to the speaker array elements may change in real-time.

Figure 11:
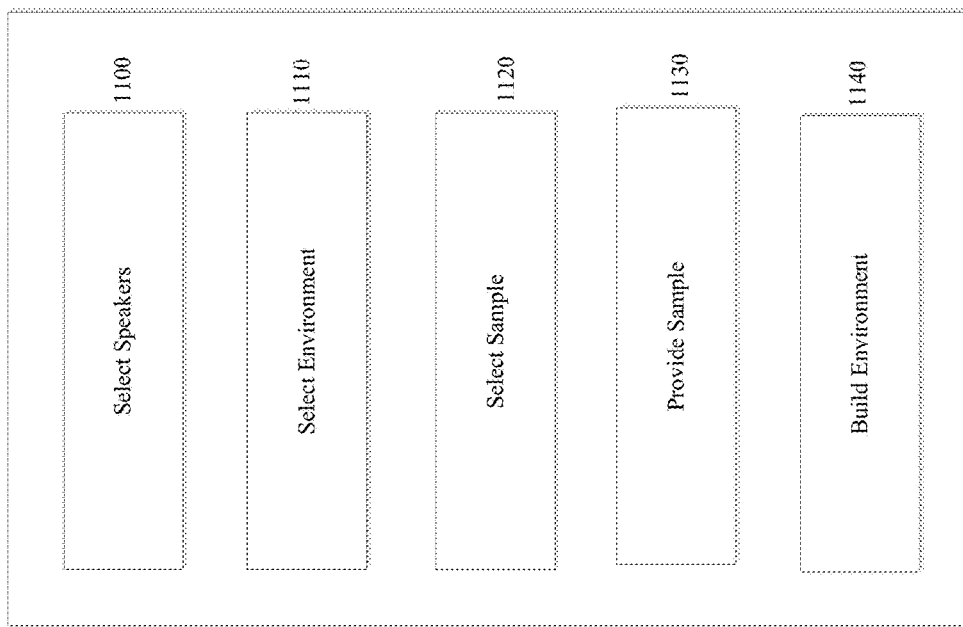
FIG. 11 is a block diagram of an exemplary user interface according to an embodiment of the invention.

FIG. 11 is a block diagram of an exemplary user interface according to an embodiment of the invention. Interface 307 includes options to select speakers 1100, select environment 1110, select a sample 1120, provide a sample 1130, and build an environment 1140.

Select speakers 1100 allow a user to select demonstration speakers for evaluation. This option may include further suboptions for selecting a make (e.g., a manufacturer like Pioneer) and a model (e.g., Pioneer 1000 Series).

Select environment 1110 allows a user to select the demonstration environment. Generally, select environment 1110 relates to characteristics that are already determined (computed or measured). This option may provide a textual and/or graphical list of demonstration environments which characteristics are readily accessible to DSP 303. The demonstration environments may be a room or auditorium, or may be the interior of a vehicle. In that latter scenario, there may be suboptions for selecting a make (e.g., a car manufacturer such as BMW) and a model (e.g., Model 540). Select environment 1110 may allow the user to modify a demonstration environment or select between various options (e.g., change a room size or select between carpet/no carpet or convertible/hardtop). Select sample 1120 provides options for the acoustic sample that is played through the virtual demonstration system. Select sample 1120 may include music (portions or the entirety of songs), test samples (tones, white noise, etc.), spoken audio, and the like. Based on the user's selection, select sample 1120 causes the DSP 303 to retrieve and process the selected acoustic sample.

Provide sample 1130 allows a user to input his/her own acoustic sample from a computer readable storage medium that stores non-transitory signals, including magnetic storage media (for example, ROMs, floppy discs, hard disks, etc.), or optically-readable media (for example, CD-ROMs, VDs, etc.). Distinct from computer readable storage medium, a user may input his/her own acoustic sample from a transmission media that stores transitory signals, such as data signals embodied in carrier waves (e.g., the network including the Internet). Provide sample 1130 may include submenus for directing the user to insert the computer readable storage medium into a reader (or connect to the Internet in the case of transmission media), select the desired acoustic sample (e.g., a portion of a song on track 5), crop the time domain data down to an appropriate size, and so forth.

Build environment 1140 provides an option for a user to build a demonstration environment. For example, this option may allow the user to simulate the room or auditorium in which loudspeakers will be placed. This option may allow the user to compare the performance of various demonstration rooms in order to decide which to build in his/her home or building. Build environment 1140 includes submenus so that the user can graphically build the demonstration room by selecting geometries and materials. Materials may automatically be linked to stored acoustic absorption or reflection performance parameters. Once the user has input the geometry and material selections, build environment 1140 analytically generates the characteristics for the demonstration environment, such as by running a ray trace model or other acoustic prediction model.

Figure 12:
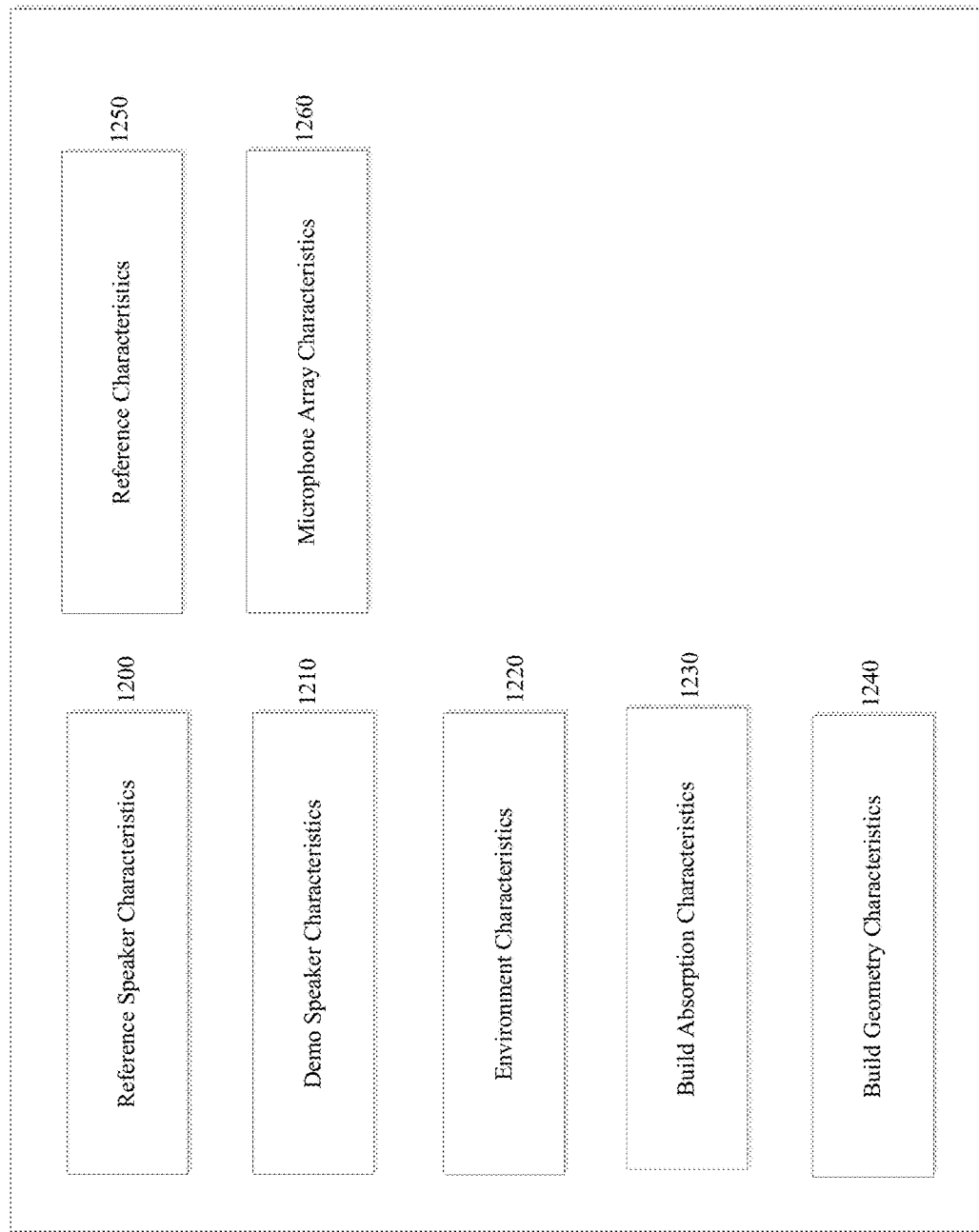
FIG. 12 is a block diagram of the exemplary characteristics that may be used by the virtual demonstration system.

FIG. 12 is a block diagram of the exemplary characteristics that may be used by the virtual demonstration system. Spatial characteristics 304 may include reference speaker characteristics 1200, demonstration speaker characteristics 1210, environment characteristics 1220, build absorption characteristics 1230, build geometry characteristics 1240, reference characteristics 1250, and microphone array characteristics 1260.

In an embodiment of the invention, reference speaker may comprise of an array of speakers. Reference speaker characteristics 1200 has the characteristics of the reference speakers used for the virtual demonstration system. These characteristics may be a transfer function, impulse response function, or equivalent mathematical description of the acoustic performance of the reference speaker. These characteristics are used to remove the effects of the reference speakers, such as by inverse filtering. Demonstration speaker characteristics 1210 has the characteristics of the various demonstration speakers that the virtual system is capable of simulating. These characteristics may be represented similar to those for the reference speakers. The demonstration speaker characteristics 1210 are used to insert the effects of the demonstration speakers, such as by digital filtering (e.g., convolution, infinite impulse response [IIR], or finite impulse response [FIR], operations in the time domain or multiplication in the frequency domain). Environment characteristics 1220 has the characteristics of the various demonstration environments that are supported by the virtual system. This module may also include the characteristic of the reference room so that its effects can be removed.

Build absorption characteristics 1230 contains absorption figures corresponding to various materials. Exemplary absorption parameters are provided in Chapter 10, Table 10, of *Reference Data for Engineers,* 9th ed. (Butterworth Heinmann, 2002). The materials may be such things as carpet, hardwood, drapes, and so forth.

Build geometry data 1240 contains selectable geometries (blocks, rectangles, stairs, floors, ceilings, etc.) that can be used in a CAD-CAM like fashion to generate a demonstration environment.

Reference characteristics 1250 contains characteristics of the various reference environments that are supported by the virtual system.

Microphone array characteristics 1260 contain characteristics representing attributes of the microphone that affect the recorded sound. These characteristics may include, for example, the susceptibility to pickup noise and hum, microphone phasing, and sensitivity.

Figure 13:
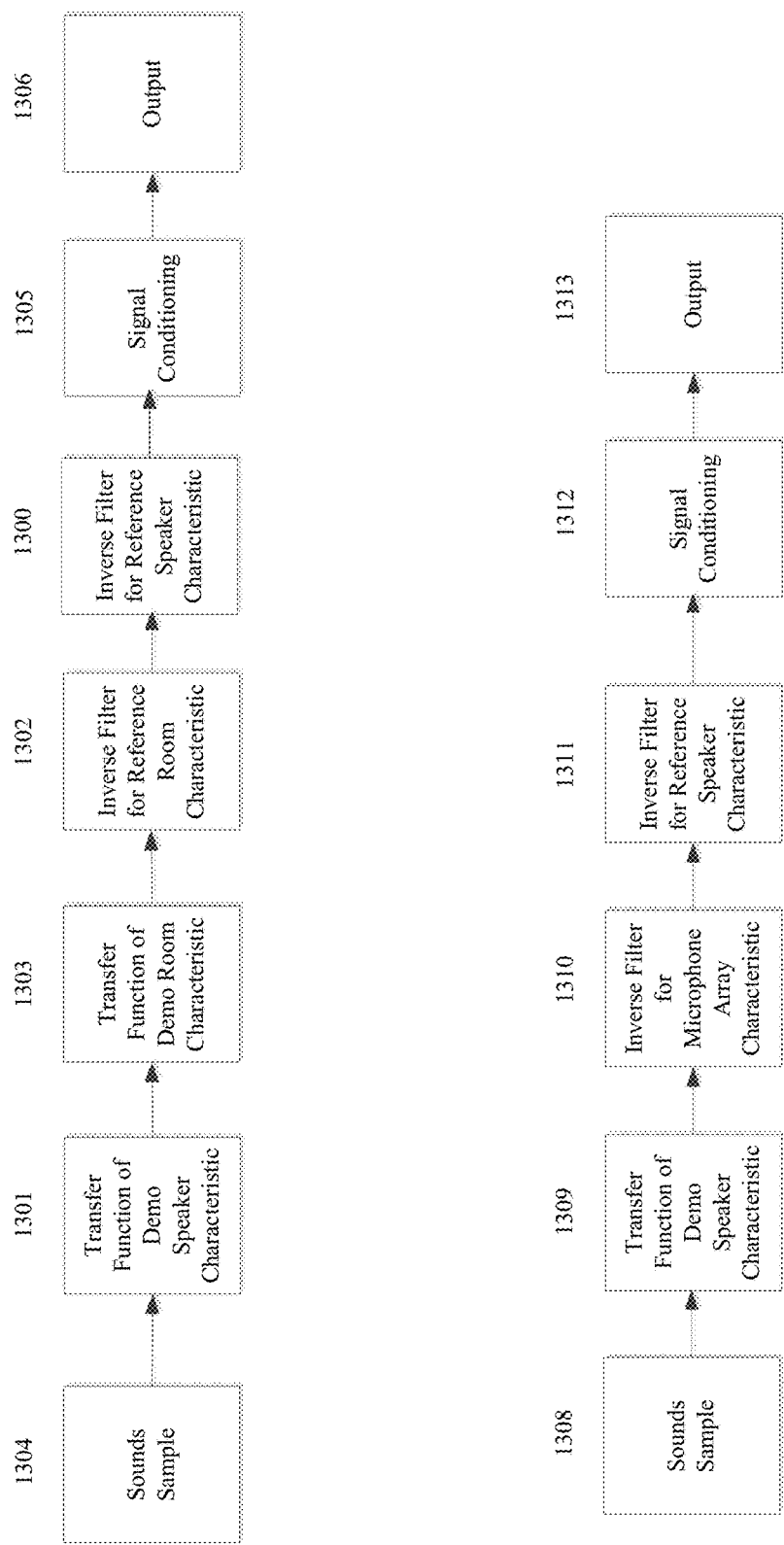
FIG. 13 is a block diagram of the digital signal processing that may be employed for the virtual demonstration according to an embodiment of the invention.

FIG. 13 is a block diagram of the digital signal processing that may be employed by DSP 303 according to an embodiment of the invention. Because the overall acoustic system is treatable as a linear system, the ordering of the operations in FIG. 13 can be changed. In block 1300, inverse filtering to remove the contribution or bias of the reference speakers is performed. In block 1301, the transfer function characteristic of the demonstration speaker is applied. In block 1302, inverse filtering is performed to remove the contribution or bias of the reference room. In block 1303, the transfer function characteristic of the demonstration room is applied. In block 1304, the acoustic sample is applied. In step 1305, various signal conditioning and digital-to-analog operations are performed before the virtual signal is output at block 1306.

It should be understood that the various filtering operations of FIG. 13 can be implemented in the time domain (e.g., convolution, infinite impulse response [IIR] filter, finite impulse response [FIR] filter) or frequency domain.

Blocks 1308-1313 illustrate digital processing that may be employed to simultaneously simulate the temporal and spatial performance of a demonstration speaker, while compensating for any bias attributable to the characteristics of the reference speakers and/or microphones in an array. This digital processing may further provide environment simulations. In an embodiment of the invention, in Block 1310, inverse filtering may be performed to remove the contribution or bias of the reference speaker, which may be a speaker array.

Figure 14:
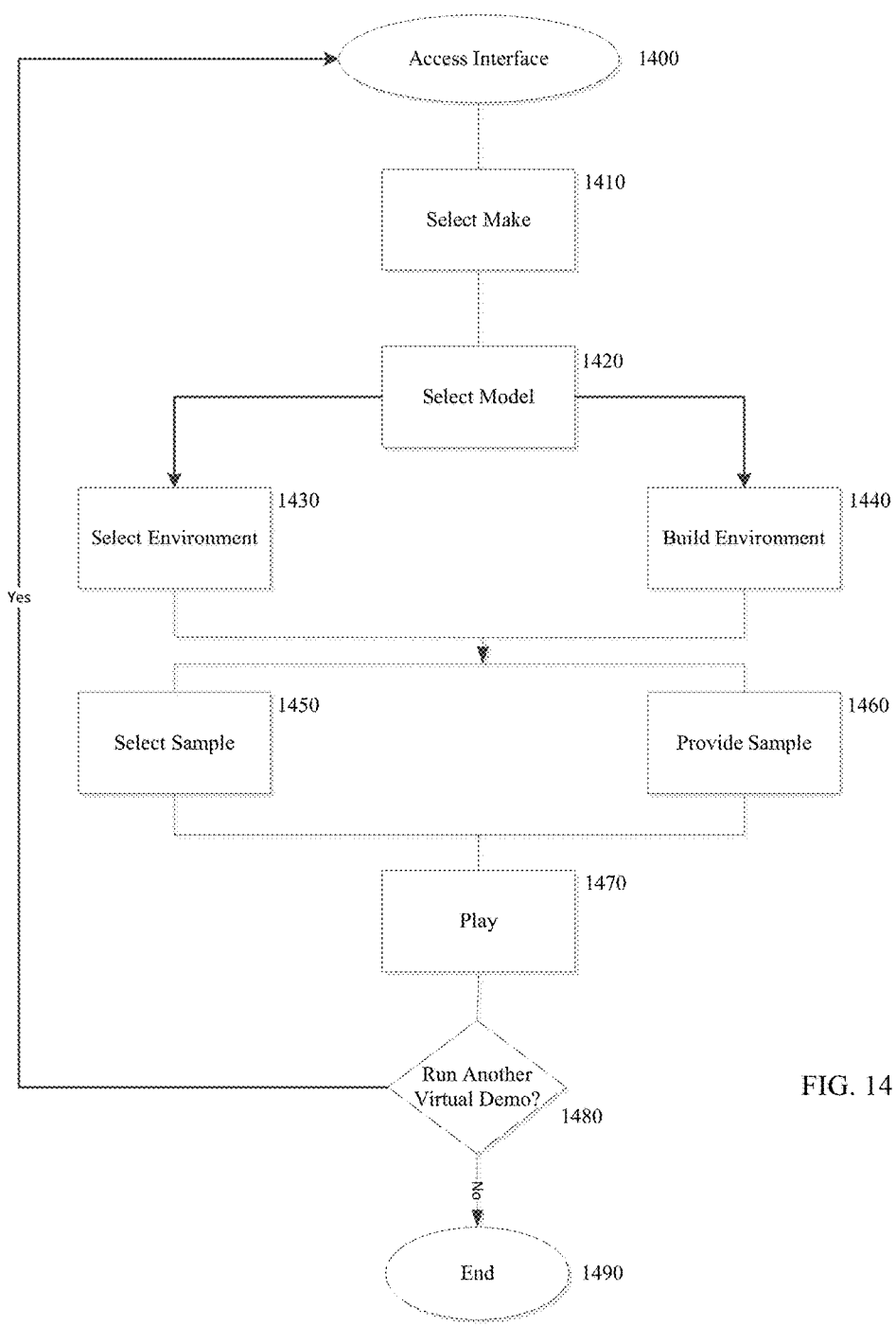
FIG. 14 is a flow diagram of a method for a user to engage the virtual demonstration system according to an embodiment of the invention.

FIG. 14 is a flow diagram of a method for a user to engage the virtual demonstration system according to an embodiment of the invention. Because the overall acoustic system is treatable as a linear system, the ordering of the operations in FIG. 14 can be changed. In step 1400, the user accesses the interface. In step 1410, the user selects a make (e.g., Pioneer). In step 1420, the user selects a model (e.g., Series 1000). In step 1430, the user can select a demonstration environment for which the characteristics are already stored by the virtual demonstration system. Alternatively, in step 1440 the user can build an environment by selecting materials and geometries.

In step 1450, the user can select an acoustic sample to play through the virtual system. Alternatively, in step 1460 the user can opt to provide a sample via a computer readable storage medium that stores non-transitory signals including magnetic storage media (for example, ROMs, floppy discs, hard disks, etc.) or optically-readable media (for example, CD-ROMs, VDs, etc.), or transmission media that stores transitory signals, such as data signals embodied in carrier waves (e.g., the network including the Internet). According to one beneficial embodiment, the virtual system includes an option to link to the Internet so that the user can download an acoustic sample.

In step 1470, the user plays the virtual demonstration. In step 1480, the user decides whether to run another virtual demonstration to compare different demonstration speakers and/or different demonstration environments. The virtual system beneficially stores the selections from the last run so that they can be used for the next run. For example, the user will not have to recreate the demonstration environment in run #2. Instead, he/she can simply select the one from the last run. The virtual system allows a user to select one or more previously stored configurations for a virtual demonstration. The method ends at 1490.

Figure 15:
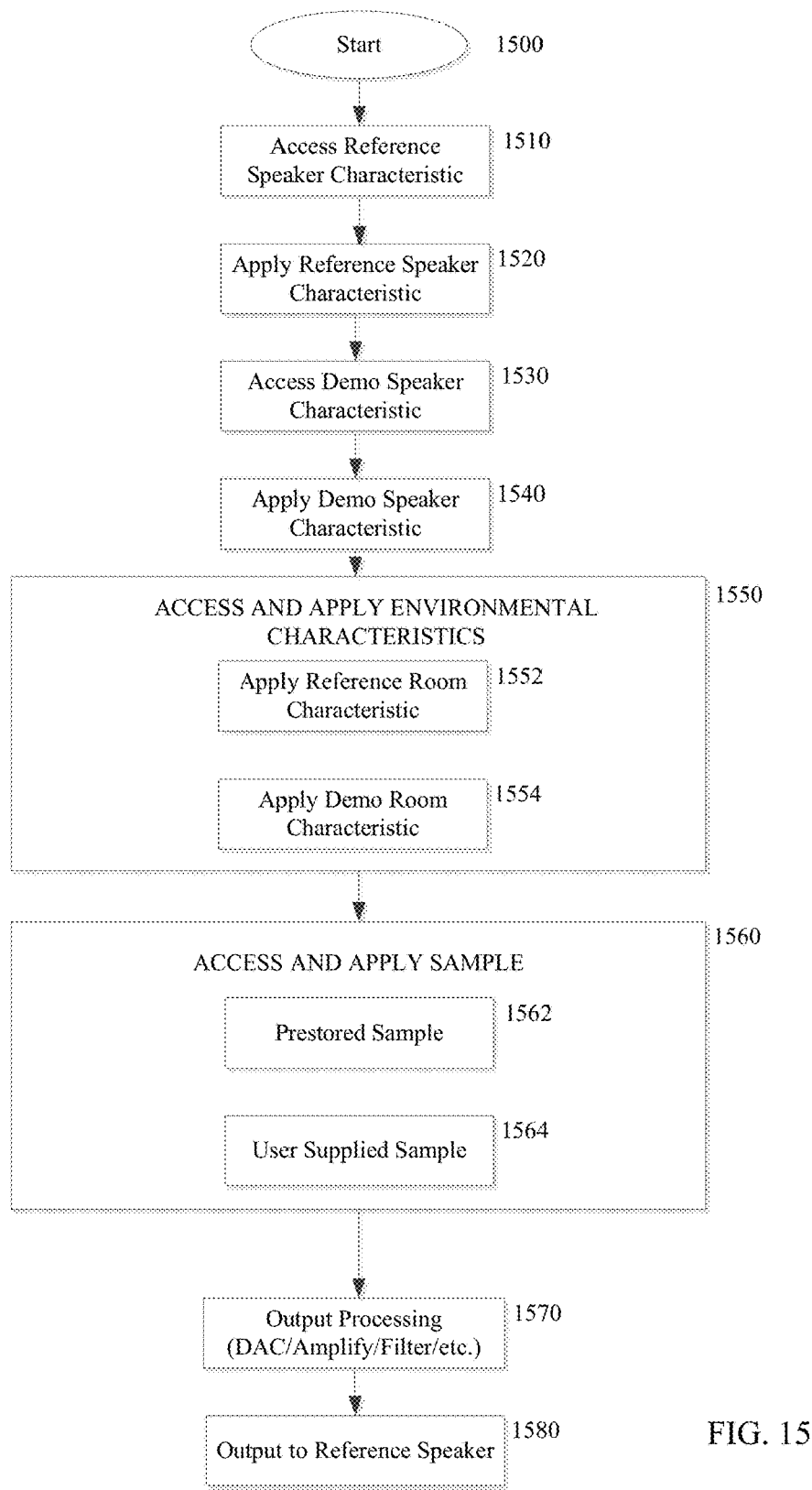
FIG. 15 is a flow diagram of a method creating a virtual demonstration according to an embodiment of the invention.

FIG. 15 is a flow diagram of a method creating a virtual demonstration according to an embodiment of the invention. After the method starts at 1500, the virtual demonstration system accesses the reference speaker characteristic at 1510, and applies the reference speaker characteristic at 1520. The application could be performed, for example, by inverse filtering in the frequency domain or time domain.

In step 1530, the virtual system retrieves a characteristic corresponding to a selected demonstration speaker, and at 1540, the virtual system applies the retrieved characteristic. This application could be performed, for example, by filtering in the frequency domain or time domain.

In step 1550, the virtual system accesses and applies environmental characteristics. For example, in step 1552 the reference room characteristic may be applied in order to remove its effects. In step 1554, a demonstration environment characteristic corresponding to a selected demonstration environment is retrieved and applied in order to include its effects.

In step 1560, the virtual system accesses and applies an acoustic sample. For example, in step 1562 a pre-stored acoustic sample that was selected by the user is applied by the virtual system. For example, in step 1564 a user-supplied (e.g., via computer readable storage medium or transmission media such as the Internet) acoustic sample is applied by the virtual system. The application of the acoustic sample could be performed, for example, by filtering the acoustic sample input with the characteristics of the reference speaker and/or demonstration speaker and/or demonstration environment in the time domain or the frequency domain.

In step 1570, the virtual system performs any ancillary output processing such as digital-to-analog conversion, filtering, amplification, signal conditioning, and so forth, before outputting the virtual signal to the reference speakers in step 1580.

Figure 16:
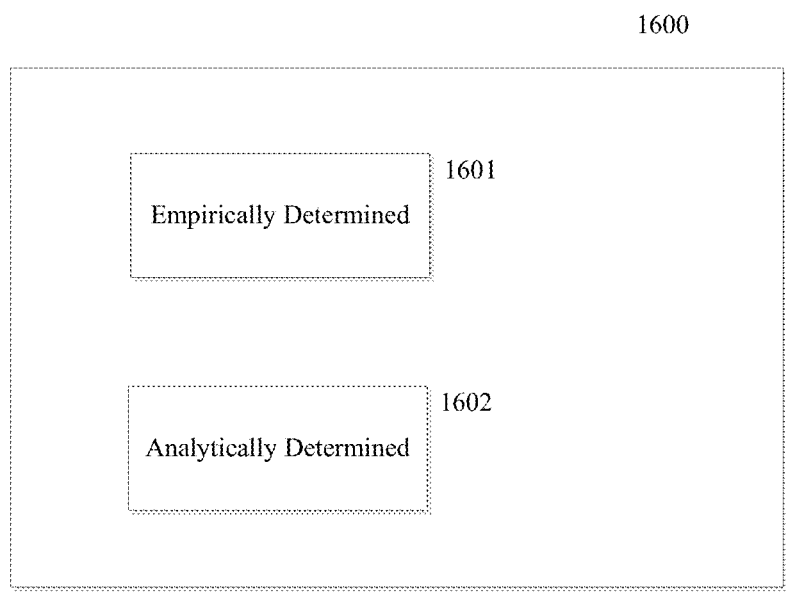
FIG. 16 is a block diagram of the loudspeaker characteristics that may be employed for the virtual demonstration according to an embodiment of the invention.

FIG. 16 is a block diagram of the loudspeaker characteristics and environmental characteristics that may be employed for the virtual demonstration according to an embodiment of the invention. Reference speaker characteristics 1200 and demonstration speaker characteristics 1210 may be empirically determined 1601. The environmental characteristics may be both empirically or analytically determined 1602, as previously discussed.

Figure 17:
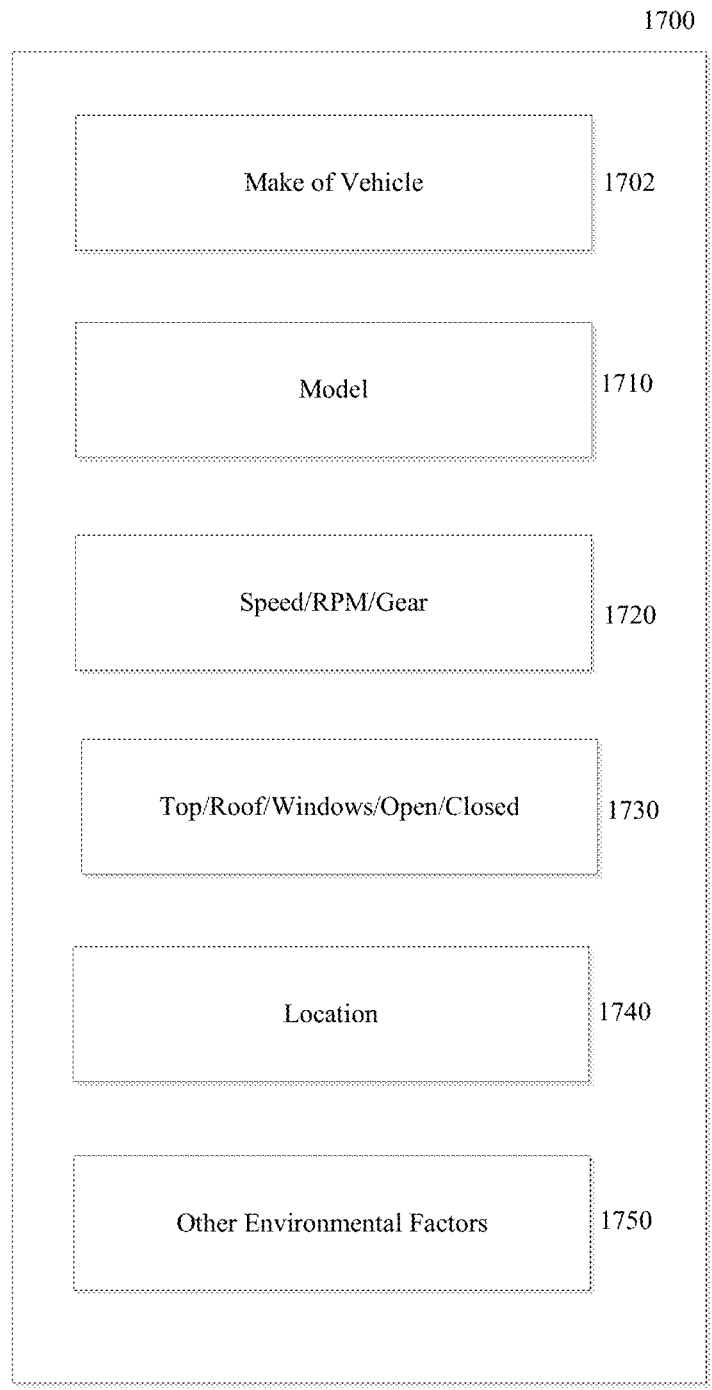
FIG. 17 is a block diagram of environmental conditions that may be employed for the virtual demonstration according to an embodiment of the invention.

FIG. 17 is a block diagram of environmental conditions that may be employed for the virtual demonstration according to an embodiment of the invention. Environmental conditions 1700 generally represent an additional set of options that can be selected by the user via interface 307. For example, in an embodiment of the invention permitting the environmental space to correspond to the interior of a vehicle like a car, environmental conditions 1700 can be used to set various operational parameters. For example, environmental conditions 1000 may allow the user to select a vehicle make 1702, model 1710, speed and/or RPM and/or gear 1720, top and/or roof and/or windows open or closed 1730, seating/listening location front/back/left/right 1740, and other environmental factors 1750.

Environmental conditions 1000 permits a user to hear the virtual demonstration in an acoustic environment of his/her selection. This acoustic environment (e.g., a BMW 328i, 50 mph, 4th gear, 3200 RPM, windows closed, driver's seat) is preferably provided by the virtual demonstration system based on empirical data measurements. This acoustic environment can be combined with the other components of the overall acoustic system (e. g., demonstration speakers) using conventional DSP processing techniques to allow the user to hear the simulated performance of the demonstration system in a vehicle in operation.

According to another beneficial aspect of the invention, the virtual demonstration system can permit a user to experience the simulated acoustic environment without demonstration speakers or an input acoustic sample. In other words, a user may not be interested in stereo equipment at all. Rather, the user is interested in making a vehicle purchase or lease, and wishes to compare the acoustic performance of competing models. Therefore, the virtual demonstration system functions as a virtual environmental factors simulation system. This application is readily extendible to other vehicles, such as planes (e.g., for flight simulation), boats (marine simulators), and the like. This application is also extendible to non-vehicle products, such as, dishwasher, lawnmower, blender, etc. That is, this application may be used to simulate sounds created by any system, even if the primary purpose of the system is not to create sound.

Figure 18:
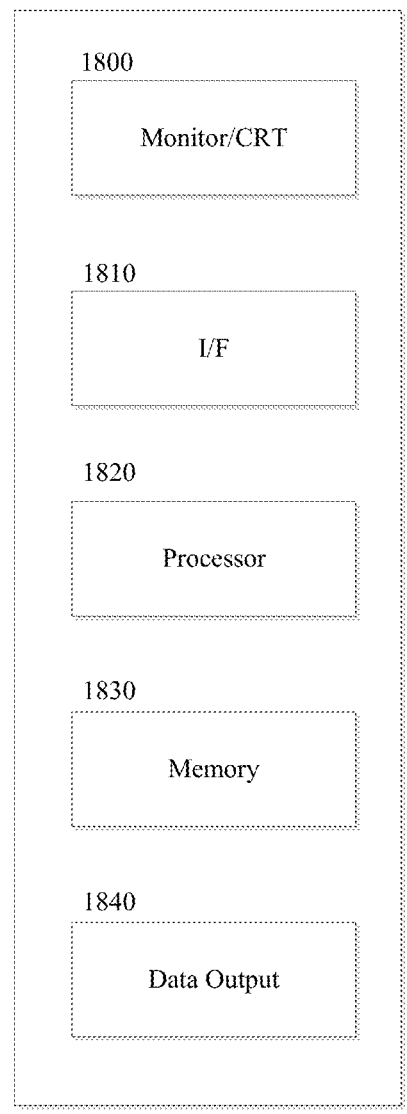
FIG. 18 is a block diagram of a system for a virtual demonstration system according to an embodiment of the invention.

FIG. 18 is a block diagram of a system for a virtual demonstration system implemented in a retail outlet. The system includes a memory 1830 for storing characteristics and acoustic samples, a processor 1820 for performing DSP processing, a user interface 1810 for allowing a user to select options, a monitor/CRT 1800 for presenting a visual of the demonstration speakers, and a data output 1840 for providing data to the user regarding the virtually demonstrated equipment.

Monitor/CRT 1800 richens the user's experience because he/she now not only hears the demonstration speaker, but sees them as well. The purchase experience is informed not only by what the equipment sounds like, but also by what it looks like. Monitor/CRT 1800 can be any suitable graphical display for displaying the demonstration speaker, such as a computer display (CRT), television display, and so forth. If the user is getting a demonstration of other equipment, such as an amplifier, monitor/CRT 1800 may display an image of that other equipment.

Data output 1840 provides data to the user regarding the equipment that is evaluated. For example, data output 1840 may output the specifications, product manuals, sales information (cost, financing options, sales prices, and the like) and/or pictures (photos or graphical images) of the equipment. Data output 1840 may be a color or black-and-white printer or memory output device (disk writer or CD writer) that can output information to the user who can then take the information home to further assess his/her contemplated purchase. For example, the user can take photos or graphical images of the demonstration speakers home to see how well their design blends with the user's decor at home.

Data output 1840 could also be a device for outputting data regarding the evaluated equipment to the user electronically over the Internet or via e-mail. For example, data output 1840 could include or be coupled to a web server for posting information on a web site accessible to the user. Data output 1840 could include or be coupled to an email server for sending an e-mail to the user with the data.

Figure 19:
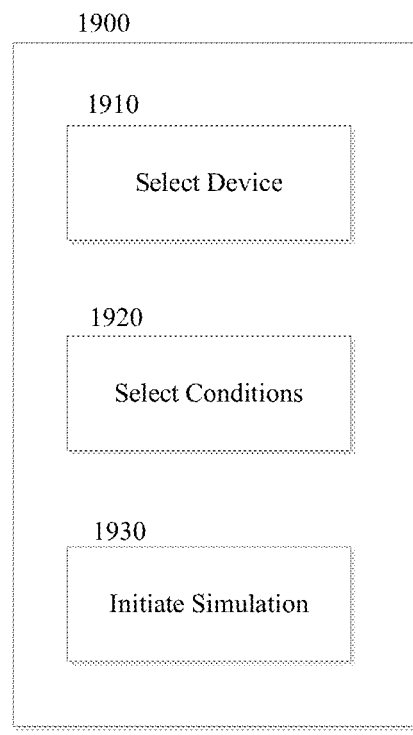
FIG. 19 is a block diagram of an interface for a user to initiate a virtual environmental factors simulation according to an embodiment of the invention.

FIG. 19 is a block diagram of an interface for a user to initiate a virtual environmental factors simulation according to an embodiment of the invention discussed above for FIG. 17. In FIG. 19, the user can select a device to be simulated at 1910. For example, a car or plane or other device (make/model). The user can select conditions at 1910 (speed/RPM/gear, over torque, ice breaking off propellers, depressurization, etc.). The user can then initiate the virtual environmental factors simulation at 1930.

Having described the virtual demonstration system according to several embodiments, it can be appreciated that numerous benefits flow from the invention that benefit all three of the consumer, the retailer, and the manufacturer.

The consumer benefits because he/she can listen to and compare multiple demonstration speakers easily and conveniently from the same reference speaker. The consumer also benefits because the virtual demonstration provides a more accurate representation of how the demonstration speakers will sound. Therefore, the consumer can make a more informed purchase decision leading to enhanced customer satisfaction.

The brick-and-mortar retailer benefits because the retailer can use a single reference speaker set or speaker array to demonstrate the performance of multiple demonstration speakers, saving costs and space, and allowing the retailer to demonstrate a wider range of products. Because of space limitations, retailers can only display, and thereby, sell a limited number of manufacturer' speakers. This invention allows retailers to demonstrate and sell a much broader selection of manufacturer' speakers.

On-line retailers benefit because the retailer can provide demonstrations at the consumer's home or office that heretofore have not been possible. Until now, one of the significant shortcomings of on-line stereo retailing versus traditional in-store retailing was that the on-line retailer had no way to demonstrate its speaker products. With the advent of the invention, this is no longer the case and, in fact, the on-line retailer's ability to provide virtual demonstration to the consumer in the convenience and comfort of the consumer's home may give on-line retailers an advantage over brick-and-mortar retailers.

Additionally, both on-line and brick-and-mortar retailers also benefit from the enhanced customer satisfaction resulting in fewer returns and more repeat business.

Manufacturers also benefit from the invention. Manufacturers benefit from enhanced customer satisfaction. Manufacturers also benefit because the invention provides a means for displaying and demonstrating a wider variety of the manufacturer's product line at retailers.

As it should be clear to those of ordinary skill in the art, further embodiments of the present invention may be made without departing from its teachings and all such embodiments are considered to be within the spirit of the present invention.

For example, the reference speakers of the virtual demonstration system could easily be replaced by high-end headphones so that the user would not need a reference room to experience the virtual demonstration. This embodiment is especially advantageous because it would remove the necessity for accounting for the bias imparted by a reference listening room. Referring to FIG. 13, block 1302 for filtering to remove the effects of the reference room would not be required because effectively there would be no reference room if headphones are used as the reference speakers. Further, if headphones are used as the reference speakers, the virtual demo may be delivered to a remote location, such as to a user's computer over the internet.

Reference headphones could be used in the virtual demonstration system to demonstrate demonstration headphones. Thus, one set of high-quality reference headphones could be used to virtually demonstrate the performance of multiple sets of headphones.

It should also be understood that the virtual demonstration system could be implemented in a wide variety of contexts beyond the traditional electronics retail outlet. Some of these venues have been described above (churches, auditoriums, etc.). Depending on the product, other venues that would benefit from the invention may include car, motorcycle, recreational vehicle (RV), and boat outlets; trade shows and similar public shows (e.g., auto shows, boat shows, home/commercial builder shows, home goods show etc.).

As suggested above, the invention can be considered to have two basic aspects: a virtual product performance aspect (for demonstrating the performance of, for example, electronics equipment like speakers, amplifiers, and the like) and a virtual environmental factors simulation aspect (for simulating various acoustic environments, like the noise inside of a car or plane during operation). The virtual product performance aspect may demonstrate performance of any product that may produce sound, such as, a speaker, dishwasher, engine, etc. The virtual environmental factors simulation aspect may simulate acoustic environments (e.g., room, vehicle, outdoors, etc.) and operational factors (e.g., speed, windows up/down, other running equipment, HVAC, and other factors that may modify the perception of the sound coming from the product that the application is trying to simulate). In some cases, an application will involve both aspects of the invention, such as when a consumer desires to hear the performance of a set of demonstration speakers (virtual product performance aspect) in a BMW 328i at 50 m.p.h., 3000 RPM, 4th gear, with the windows open (virtual environmental factors simulation aspect).

In other cases, an application will involve only one aspect of the invention, such as when a consumer wishes to evaluate or experience the acoustic conditions of various cars, planes, boats, and the like. For example, the consumer may wish to compare noise levels in cars during various operating conditions, as previously discussed. The consumer may wish to compare noise levels for various options for a given car, such as a six-cylinder engine versus eight-cylinder engine, stick shift versus automatic, wide sport tires versus standard tires, convertible versus hardtop, headlights up versus down, windows up versus down, top up versus closed, and so forth. In another context, outboard engine manufacturers or retailers can use the virtual environmental factors simulation aspect of the invention in order to provide a simulation of engine noise for a boat in operation. The system would allow selection of various options which characteristics would be processed to generate a simulated noise output. The various options could include such things as engine type, boat type/shape/geometry, speed, RPM, sea state (wave height), two-cycle versus four-cycle engine, various power settings, various locations in the boat (forward, aft, left, right, deck, below), distance from shore, and so forth.

Other examples of applications for virtual environmental factors simulation might be found in other consumer, educational, regulatory, and industrial applications. As just one example, active noise cancellation (ANC) is now finding application in consumer and industrial settings. The virtual environmental factors simulation aspect of the present invention would find beneficial application to demonstrating the efficacy of active noise cancellation. For example, a firm developing and marketing high-end active noise cancellation technology to large industry companies would obviously benefit from being able to demonstrate the improvement in noise levels that an ANC installation would bring.

As suggested above, the virtual demonstration system software could be packaged for use in a home or office using high quality reference speakers or headphones. The software could be provided by disk or other computer readable storage media or, alternatively, could be made available for download over the Internet. For so-called "on-line" retailers not having traditional "brick & mortar" outlets, this embodiment could be extremely beneficial. Preferably, this embodiment would include interface options for selecting the type of reference speakers or headphones to be used for specific users so that their effects can be compensated. In a further variation to this approach, the user could use high performance reference speakers in the form of free-standing speakers (e.g., floor speakers, speakers on a stand, bookshelf speakers, etc.) or headphones provided by the retailer or another entity (e.g., club, friend, speaker manufacturer, other business, band, etc.). This embodiment has the advantage that the user need not own any special equipment to experience the virtual demonstration in the comfort of his/her home or office using basic computer hardware, such as a personal computer.

According to a further variation of the invention, virtual demonstration software could be run by the user in conjunction with basic home speakers for virtually demonstrating car audio speakers. Most basic home speakers will have adequate acoustic performance to simulate the performance of car speakers. Thus, a user could practice the invention in accordance with the exemplary embodiments of FIGS. 11, 14, 17, and 19, in order to virtually demonstrate the performance of car speakers in an operational environment (make/model of car, speed, RPM, windows up/down, etc.).

According to yet another variation, a retailer, audio systems contractor, or other business ("demonstrator") could use the virtual demonstration system of the invention in order to provide on-site demonstrations of various demonstration speakers under different environmental conditions. For example, a demonstrator could bring portable versions of the virtual demonstration system with a set of reference speakers to a place of worship, auditorium, home, office, industrial facility, club, theater, school, or the like in order to demonstrate performance of various demonstration speakers and other equipment (e.g., amplifiers of varying grades and powers). In such a case, the user interface may provide an option to exclude any compensation for environment because no reference environment is being used and no demonstration environment is selected. Rather, the actual listening environment is being used.

In some cases, a customer would request that the demonstration take place in a room or building that is not completed so that an interim assessment can be made. Such an interim assessment could include virtually demonstrating the impact of various materials (e.g., furniture, acoustic tile and panels, carpeting, drapery, etc.) so that the customer could make decisions on material selection based on expected acoustic performance. Such an interim assessment might entail the measurement or prediction of the transfer characteristic (or impulse response) of the existing space where the demonstration would take place.

Additionally, while the reference speakers are generally discussed in terms of pairs of speakers, the virtual demonstration system could easily employ further speakers so that a fully immersive acoustic experience could be simulated.

Additionally, the build environment feature of the invention can be made relatively simple or complex depending on the sophistication and needs of the average user. For example, the user may be asked to identify the percentage of wall surfaces using highly reflective materials (e.g., glass, wood paneling, untreated drywall, etc.), the percentage of wall surfaces covered with absorptive materials (e.g., curtains or fabric wall art), the nature of the floor material (e.g., wood, vinyl, or carpet), the composition of the ceiling (e.g., acoustic tile, wood paneling or drywall), the ceiling design (e.g. flat or cathedral), the density of upholstered furniture (e.g., high, medium, or low), and/or the shape of the room.

Additionally, it should be understood that the components of the virtual demonstration system need not be collocated in one place. For example, referring to FIG. 3, an implementation at a retail outlet may have the interface 307, DSP 303, and reference speakers 306 in a listening room, while the spatial characteristics 304 and samples 305 may be remotely located. For example, the characteristics 304 and/or samples 305 may be located at one or more web sites or non-Internet remote servers maintained by the retailer or by the manufacturers. If maintained by the manufacturers, this beneficial embodiment would allow manufacturers to update and revise their demonstration speaker characteristics as they change or as new models are released to market.

In a similar variation where the user is a consumer at home or at a business site, the interface 307, DSP 303 and reference speakers 306 are at the user's remote site, while the characteristics are maintained by the retailer and/or a manufacturer at a web site or non-Internet remote server.

For typical retailers having stores with listening rooms, the invention could be beneficially applied so that each manufacturer would need to supply only their best, top-of-the-line speaker. This speaker could be used as the reference speaker for that manufacturer, and the various DSP operations and demonstration characteristics could be applied to virtually demonstrate the manufacturer's other speakers through the top-of-the-line model. This application would allow each manufacturer to demonstrate the entire line, while allowing the retailer to save valuable floor space.

Additionally, it should be understood that the various operations are presented so as to best explain the invention in a clear manner. These operations could easily be further divided or combined. For example, in FIG. 13 the filtering operations for the reference speakers (block 1300) and the demonstration speakers (block 1301) could easily be combined into a single operation.

Therefore, it is intended that all matter contained in above description or shown in the accompanying drawings shall be interpreted as exemplary and not limiting, and it is contemplated that the appended claims will cover any other such embodiments or modifications as fall within the true scope of the invention.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, applications, components, data structures, etc., that perform particular tasks or implement particular abstract data types.

Those skilled in the art will appreciate that the invention may be practiced with various computer system configurations, including hand-held wireless devices such as mobile phones, tablets or PDAs, multiprocessor systems, microprocessor-based or programmable consumer electronics, mini-computers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Mobile computers typically include a variety of computer readable media that can form part of the system memory and be read by the processing unit. By way of example, and not limitation, computer readable media may comprise computer storage media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as the Macintosh® OS or iOS operating systems, Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowchart. Such a set of instructions for performing a particular task may be characterized as a program, software program, software, engine, module, component, mechanism, or tool. The computer may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript, for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer readable storage media that stores non-transitory signals. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The computer readable storage media is typically connected to the system bus through a removable or non-removable memory interface.

Distinct from computer readable storage medium, the computing environment may also include transmission media that stores transitory signals. For example, transmission media may include data signals embodied in carrier waves or digital data packets (e.g., transmitted through a network).

The processing unit that executes commands and instructions may be a general purpose computer, but may utilize any of a wide variety of other technologies including a special purpose computer, a microcomputer, mini-computer, mainframe computer, programmed microprocessor, micro-controller, peripheral integrated circuit element, a CSIC (Visitor Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI, for example. For wireless communications, communications protocols may include Bluetooth, Zigbee, IrDa, Wi-Fi, 2G, 3G, Ultra-Wideband and Long Term Evolution (LTE) or other suitable protocols. The wireless communications protocol may also include short-range communications devices and protocols, such as RFID, or Near-Field Communication radio transmissions. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

The invention claimed is:

1. A method for simulating acoustic performance of speakers, comprising:
   receiving, via a user interface, a first user selection of a first demonstration speaker;
   retrieving, from a storage medium, spatial audio characteristics of said first demonstration speaker reflecting acoustic outputs of said first demonstration speaker measured at multiple points in space;
   simulating, with at least one computer processor or digital signal processor, acoustic performance of said first demonstration speaker by applying said spatial audio characteristics of said first demonstration speaker to an acoustic sample to generate a first simulated acoustic output; and
   outputting said first simulated acoustic output via at least one reference speaker.

2. The method according to claim 1, wherein said first simulated acoustic output is generated at least in part by compensating for a performance characteristic of said at least one reference speaker.

3. The method according to claim 1, further comprising:
   receiving a second user selection of a second demonstration speaker;
   retrieving spatial audio characteristics of said second demonstration speaker;
   simulating, with at least one computer processor or digital signal processor, acoustic performance of said second demonstration speaker by applying said spatial audio characteristics of said second demonstration speaker to said acoustic sample to generate a second simulated acoustic output; and
   outputting said second simulated acoustic output via said at least one reference speaker to facilitate a comparison of acoustic performance between said first demonstration speaker and said second demonstration speaker.

4. The method according to claim 1, further comprising:
   receiving identification or configuration of an environment; and
   simulating the acoustic performance of said first demonstration speaker by applying both said spatial audio characteristics of said first demonstration speaker and spatial characteristics of said environment to said acoustic sample to generate said first simulated acoustic output.

5. The method according to claim 4, wherein said environment comprises an interior space of a room or a vehicle.

6. The method according to claim 4, wherein said identification or configuration of said environment comprises data associated with one or more of:
   a location of said first demonstration speaker in said environment;
   configuration of objects in said environment; and
   a listening location in or near said environment.

7. The method according to claim 6, wherein said environment comprises an interior space of a vehicle, and wherein said identification or configuration of said environment further comprises data associated with one or more of:
   environmental conditions regarding the vehicle; and
   operating conditions regarding the vehicle.

8. The method according to claim 7, wherein said identification or configuration of said environment further comprises data associated with one or more of:
   a vehicle make;
   a vehicle model;
   traveling speed;
   RPM;
   a gear position;
   engagement status of a convertible top or sunroof; and
   engagement status of windows.

9. The method according to claim 1, further comprising:
   presenting a visual display comprising an image of said first demonstration speaker.

10. The method according to claim 1, further comprising:
    presenting a visual display comprising data concerning said first demonstration speaker.

11. The method according to claim 1, wherein said first demonstration speaker comprises first headphones and said at least one reference speaker comprises second headphones.

12. The method according to claim 1, wherein said first demonstration speaker comprises headphones and said at least one reference speaker comprises one or more audio speakers.

13. The method according to claim 1, wherein said first demonstration speaker comprises one or more first audio speakers and said at least one reference speaker comprises one or more second audio speakers.

14. The method according to claim 1, wherein said first demonstration speaker comprises one or more audio speakers and said at least one reference speaker comprises headphones.

15. A system for simulating acoustic performance of speakers, comprising:
   at least one reference speaker;
   a user interface;
   storage medium storing spatial audio characteristics of one or more demonstration speakers reflecting acoustic outputs of each of said one or more demonstration speakers measured at multiple points in space; and
   a computer processor or digital signal processor (DSP) configured to:
      receive, via said at least one user interface, a first user selection of a first demonstration speaker;
      retrieve, from said storage medium, spatial audio characteristics of said first demonstration speaker;
      simulate acoustic performance of said first demonstration speaker by applying said spatial audio characteristics of said first demonstration speaker to an acoustic sample to generate a first simulated acoustic output; and
      output said first simulated acoustic output via said at least one reference speaker.

16. The system according to claim 15, wherein said first simulated acoustic output is generated at least in part by compensating for a performance characteristic of said at least one reference speaker.

17. The system according to claim 15, further configured to:
   receive a second user selection of a second demonstration speaker;
   retrieve spatial audio characteristics of said second demonstration speaker;
   simulate acoustic performance of said second demonstration speaker by applying said spatial audio characteristics of said second demonstration speaker to said acoustic sample to generate a second simulated acoustic output; and
   output said second simulated acoustic output via said at least one reference speaker to facilitate a comparison of acoustic performance between said first demonstration speaker and said second demonstration speaker.

18. The system according to claim 15, further configured to:
   receive identification or configuration of an environment; and
   simulate the acoustic performance of said first demonstration speaker by applying both said spatial audio characteristics of said first demonstration speaker and spatial characteristics of said environment to said acoustic sample to generate said first simulated acoustic output.

19. The system according to claim 18, wherein said environment comprises an interior space of a room or a vehicle.

20. The system according to claim 18, wherein said identification or configuration of said environment comprises data associated with one or more of:
   a location of said first demonstration speaker in said environment;
   configuration of objects in said environment; and
   a listening location in or near said environment.

21. The system according to claim 20, wherein said environment comprises an interior space of a vehicle, and wherein said identification or configuration of said environment further comprises data associated with one or more of:
   environmental conditions regarding the vehicle; and
   operating conditions regarding the vehicle.

22. The system according to claim 21, wherein said identification or configuration of said environment further comprises data associated with one or more of:
   a vehicle make;
   a vehicle model;
   traveling speed;
   RPM;
   a gear position;
   engagement status of a convertible top or sunroof; and
   engagement status of windows.

23. The system according to claim 15, further configured to:
   present a visual display comprising an image of said first demonstration speaker.

24. The system according to claim 15, further configured to:
   present a visual display comprising data concerning said first demonstration speaker.

25. The system according to claim 15, wherein said first demonstration speaker comprises first headphones and said at least one reference speaker comprises second headphones.

26. The system according to claim 15, wherein said first demonstration speaker comprises headphones and said at least one reference speaker comprises one or more audio speakers.

27. The system according to claim 15, wherein said first demonstration speaker comprises one or more first audio speakers and said at least one reference speaker comprises one or more second audio speakers.

28. The system according to claim 15, wherein said first demonstration speaker comprises one or more audio speakers and said at least one reference speaker comprises headphones.

29. A method for simulating acoustic performance of speakers, comprising:
   measuring spatial audio characteristics of a demonstration speaker by: (a) receiving, with at least one microphone, acoustic outputs of said demonstration speaker at multiple points in space, and (b) deriving, with at least one computer processor or digital signal processor, said spatial audio characteristics based at least in part on said microphone-received acoustic outputs;
   storing said measured spatial audio characteristics of said demonstration speaker; and
   making said measured spatial audio characteristics of said demonstration speaker accessible to a computer processor or digital signal processor configured to simulate acoustic performance of said demonstration speaker by applying said measured spatial audio characteristics of said demonstration speaker to an acoustic sample to generate a simulated acoustic output via at least one reference speaker.

* * * * *